Jan. 12, 1932.　　　W. B. STOUT　　　1,840,643
AIRPLANE
Filed July 11, 1925　　　16 Sheets-Sheet 3
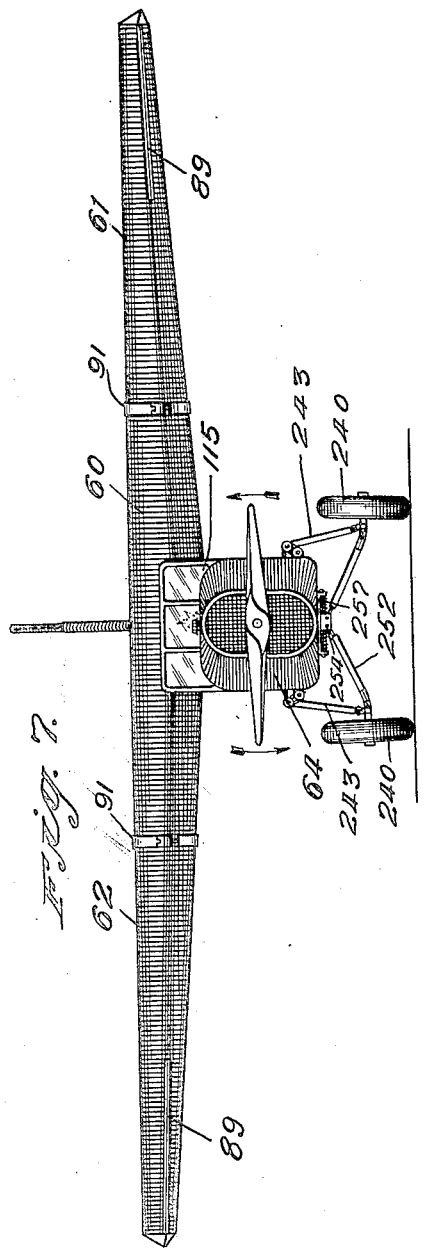
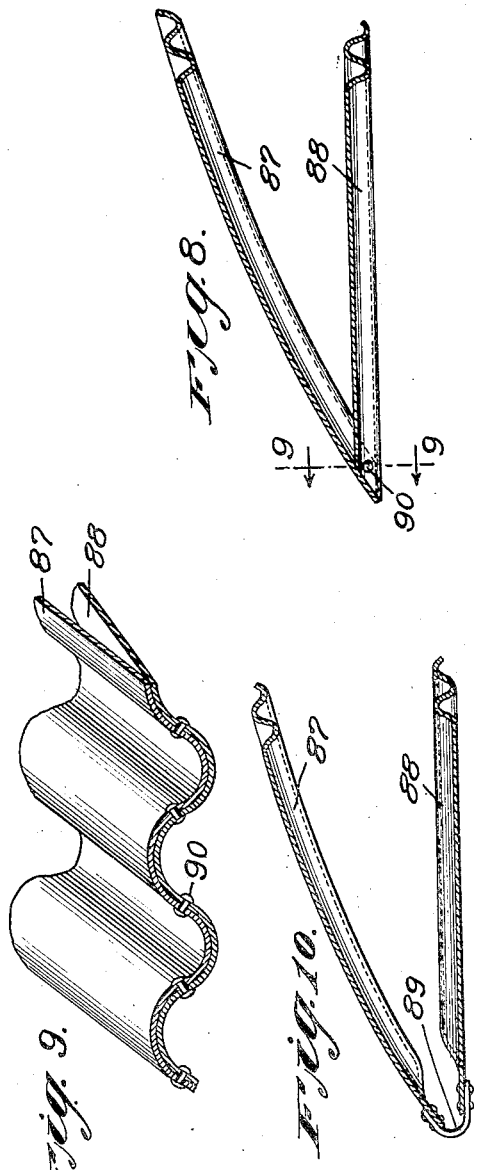

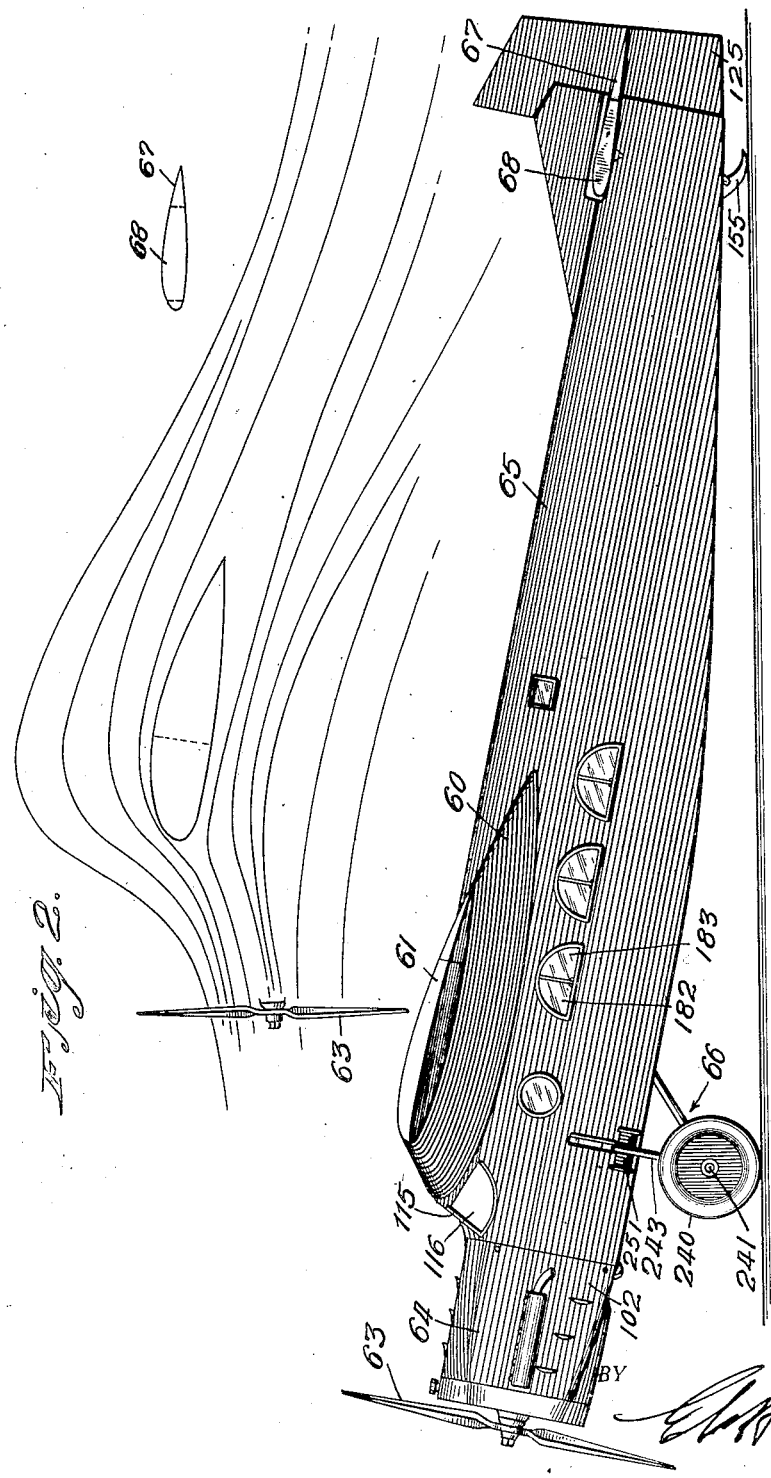

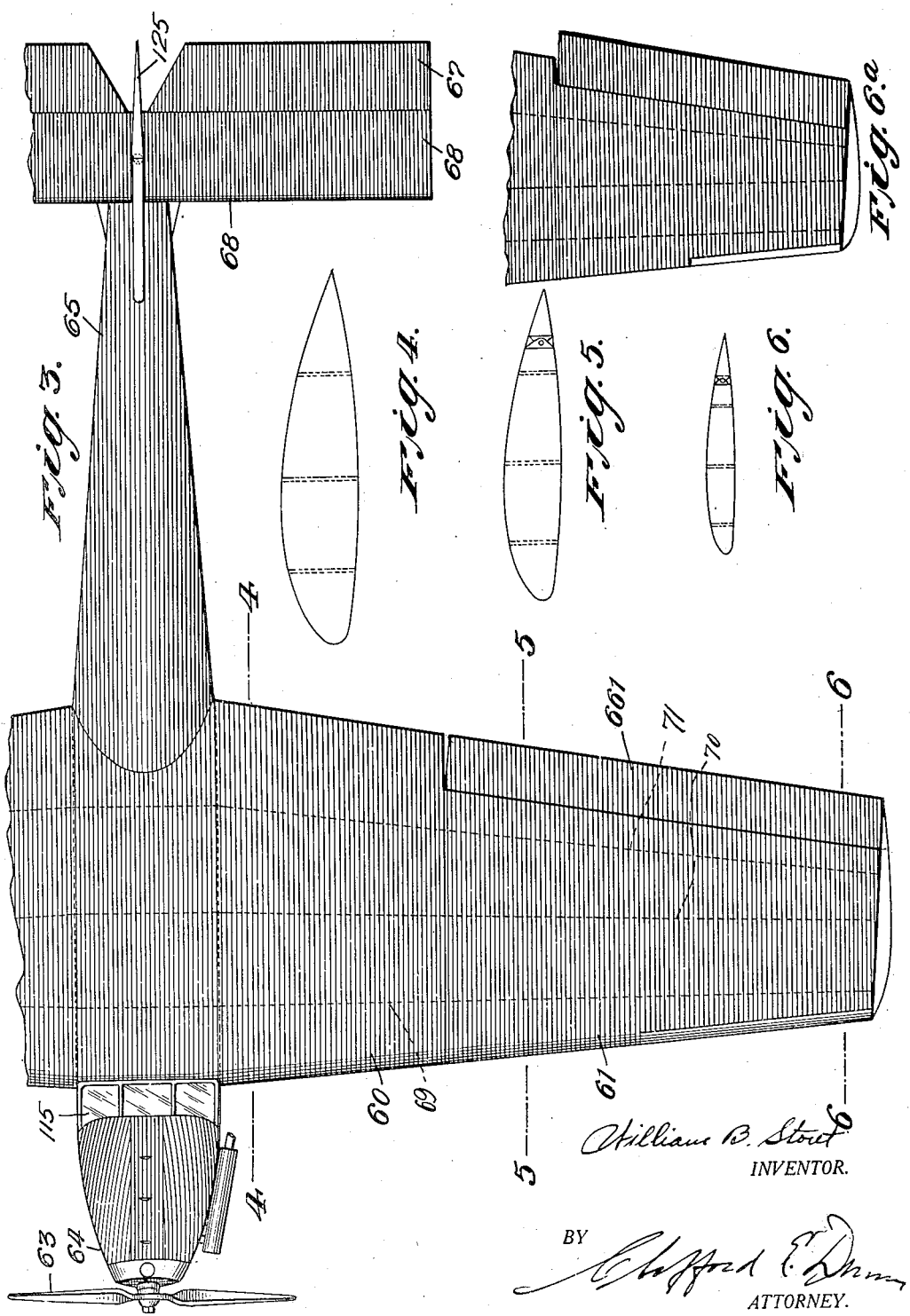

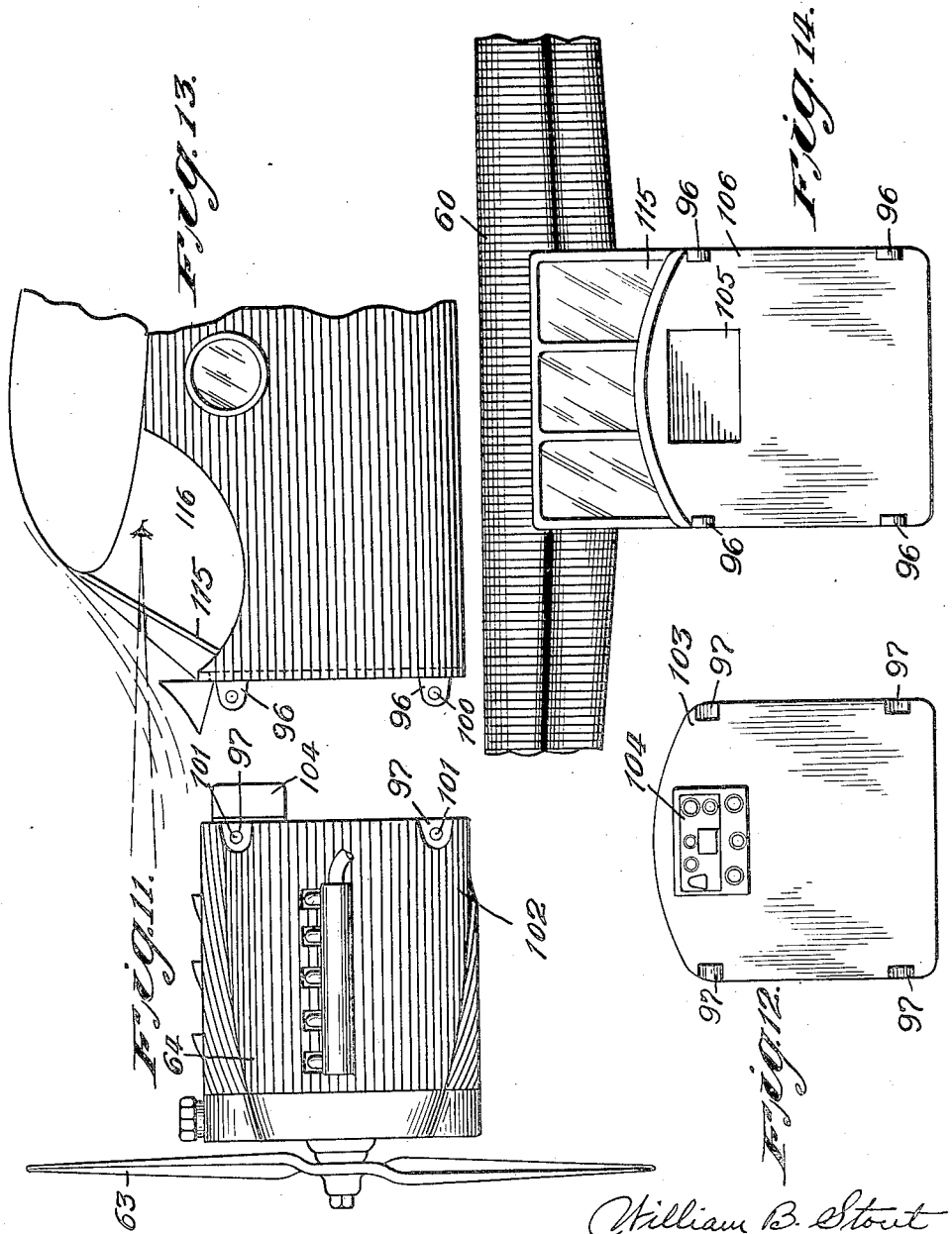

Jan. 12, 1932. W. B. STOUT 1,840,643
AIRPLANE
Filed July 11, 1925 16 Sheets-Sheet 5

William B. Stout
INVENTOR.

BY Clifford Dunn
ATTORNEY.

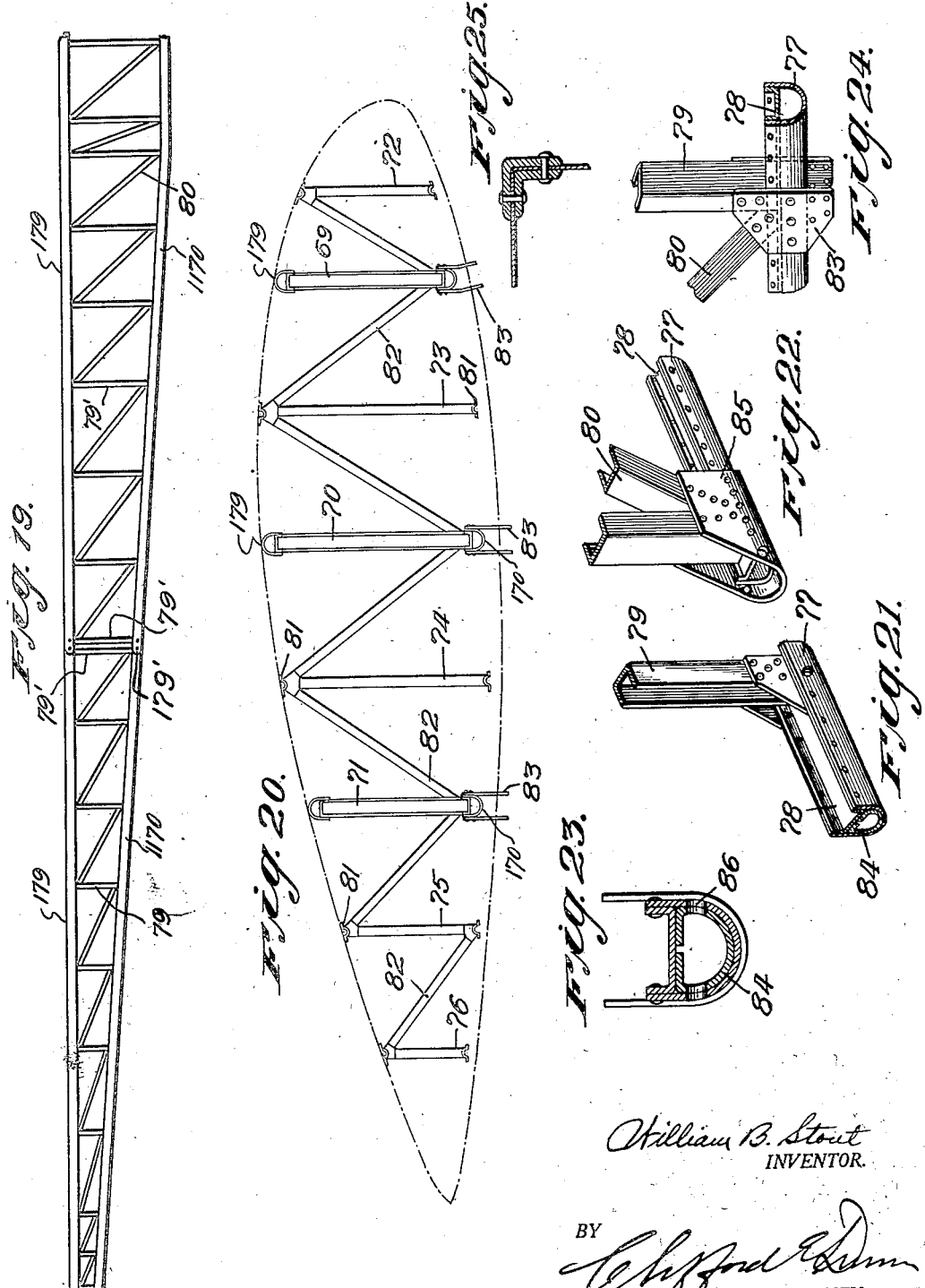

Jan. 12, 1932.    W. B. STOUT    1,840,643
AIRPLANE
Filed July 11, 1925    16 Sheets-Sheet 7
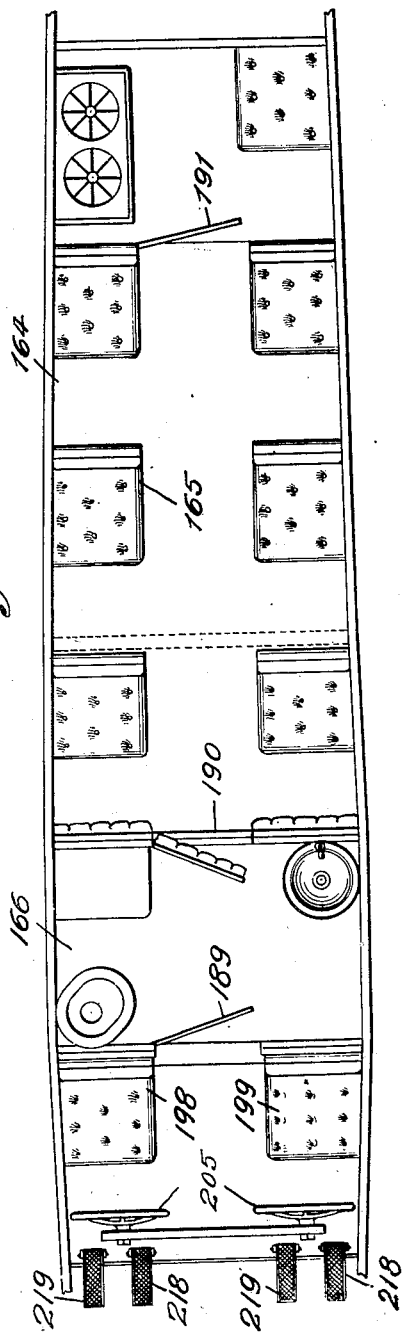
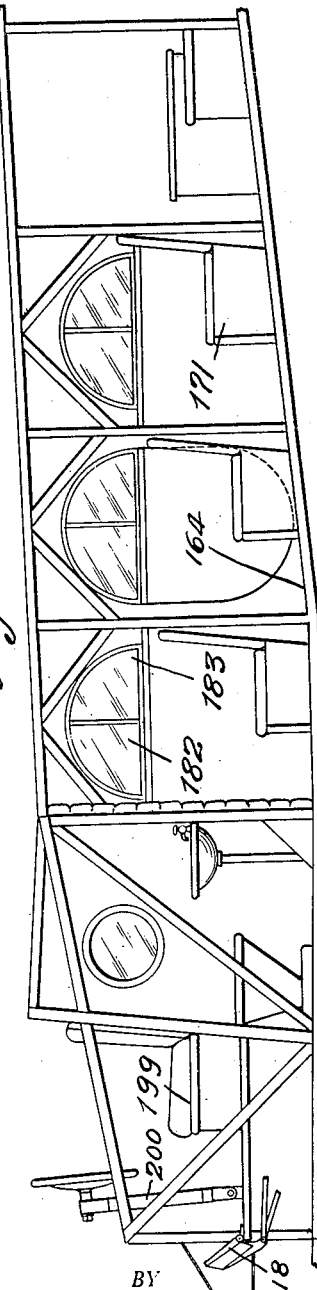

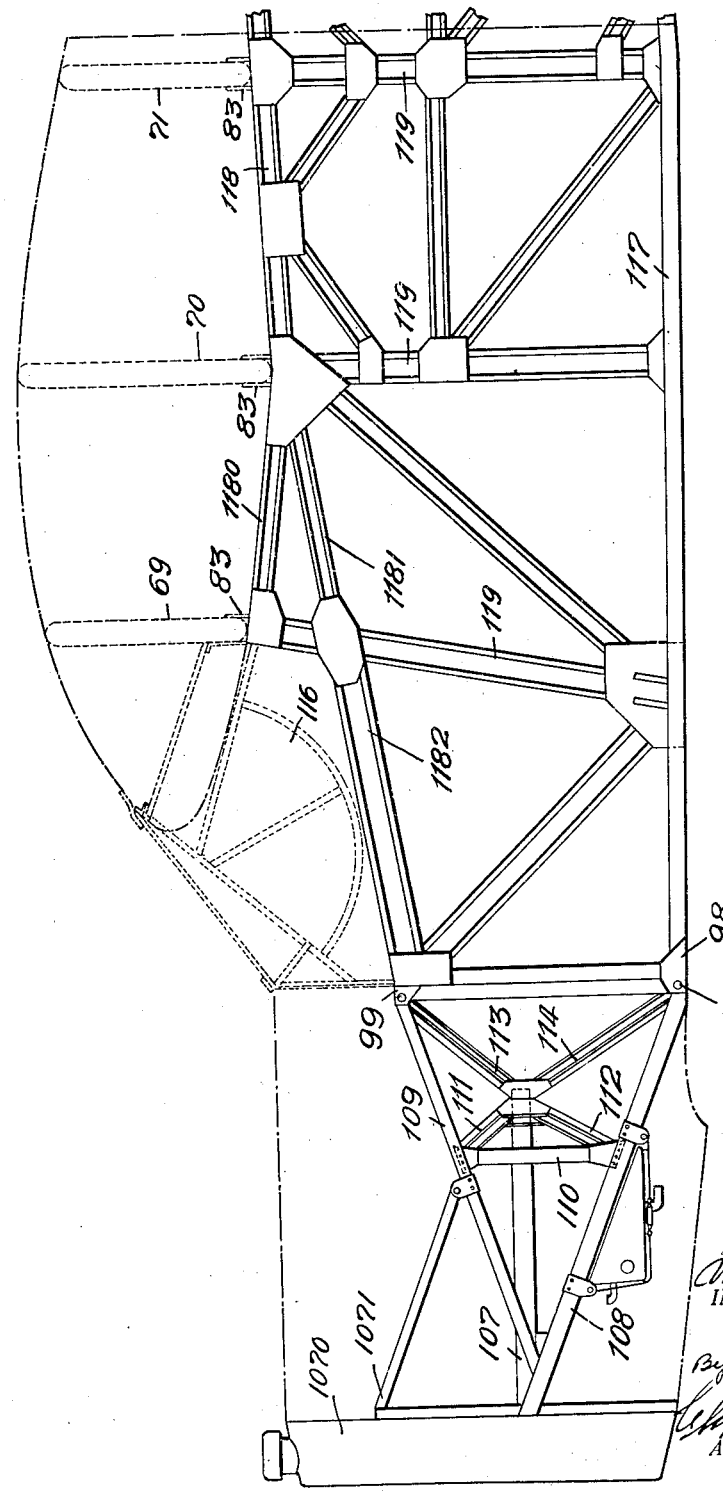

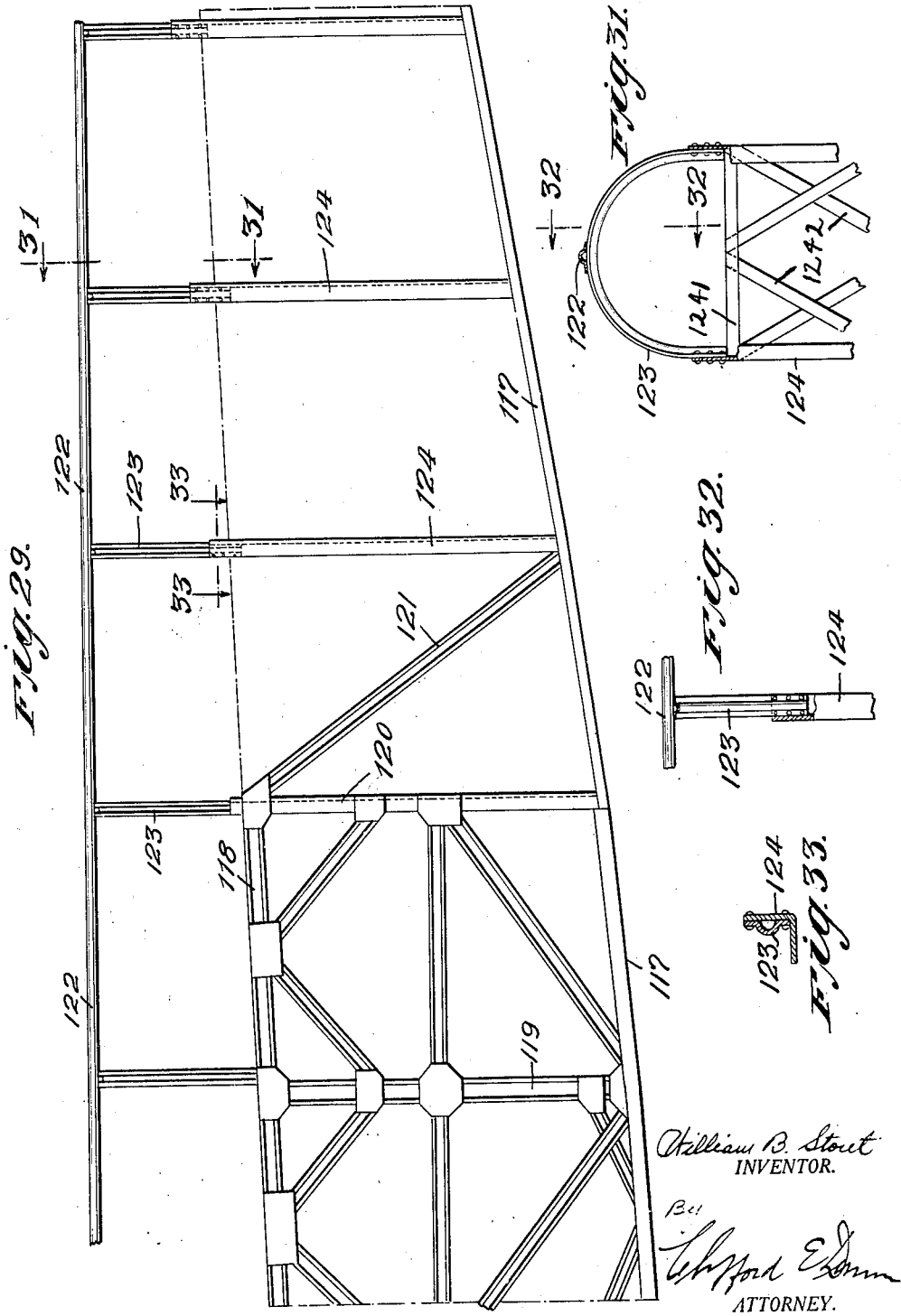

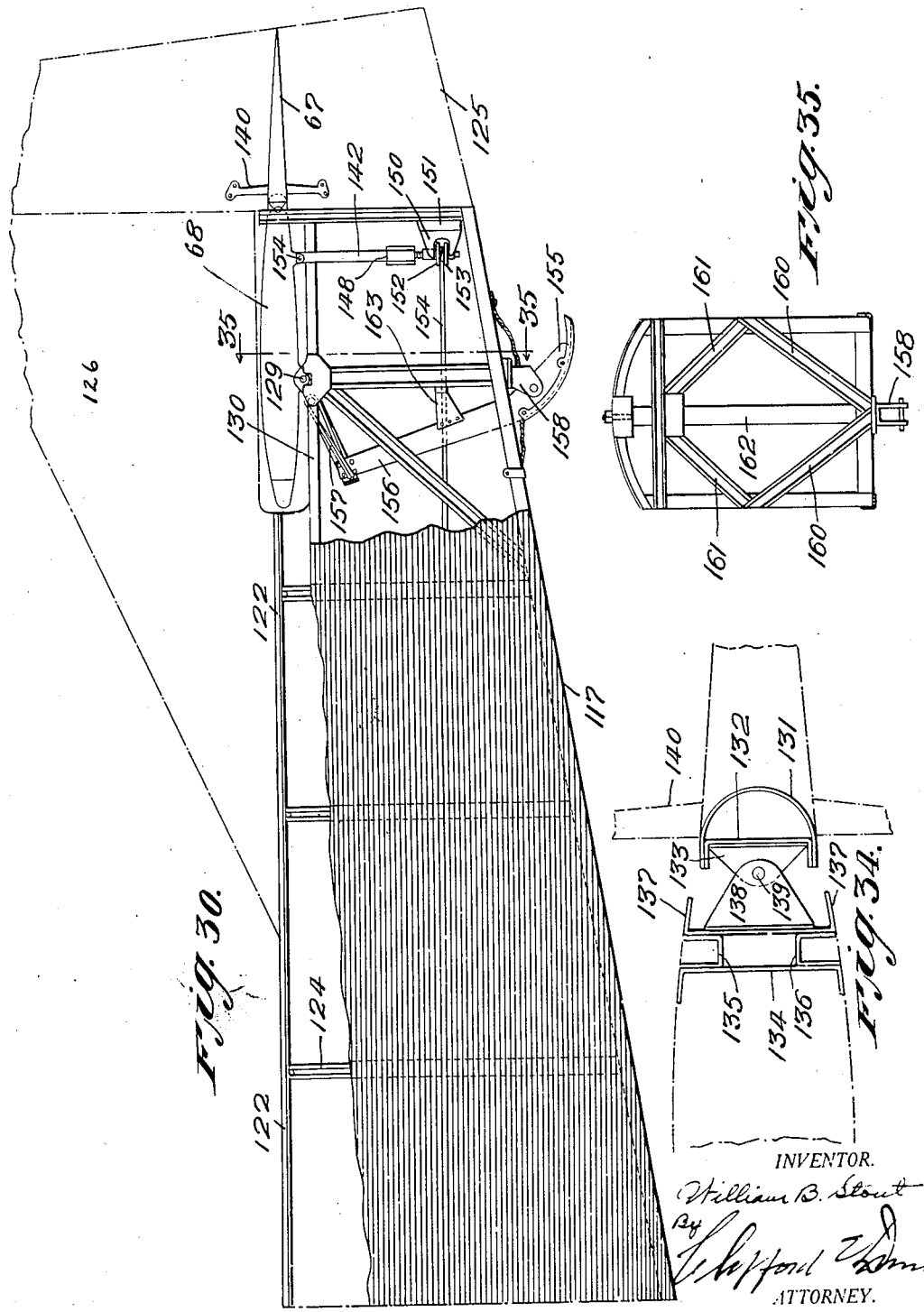

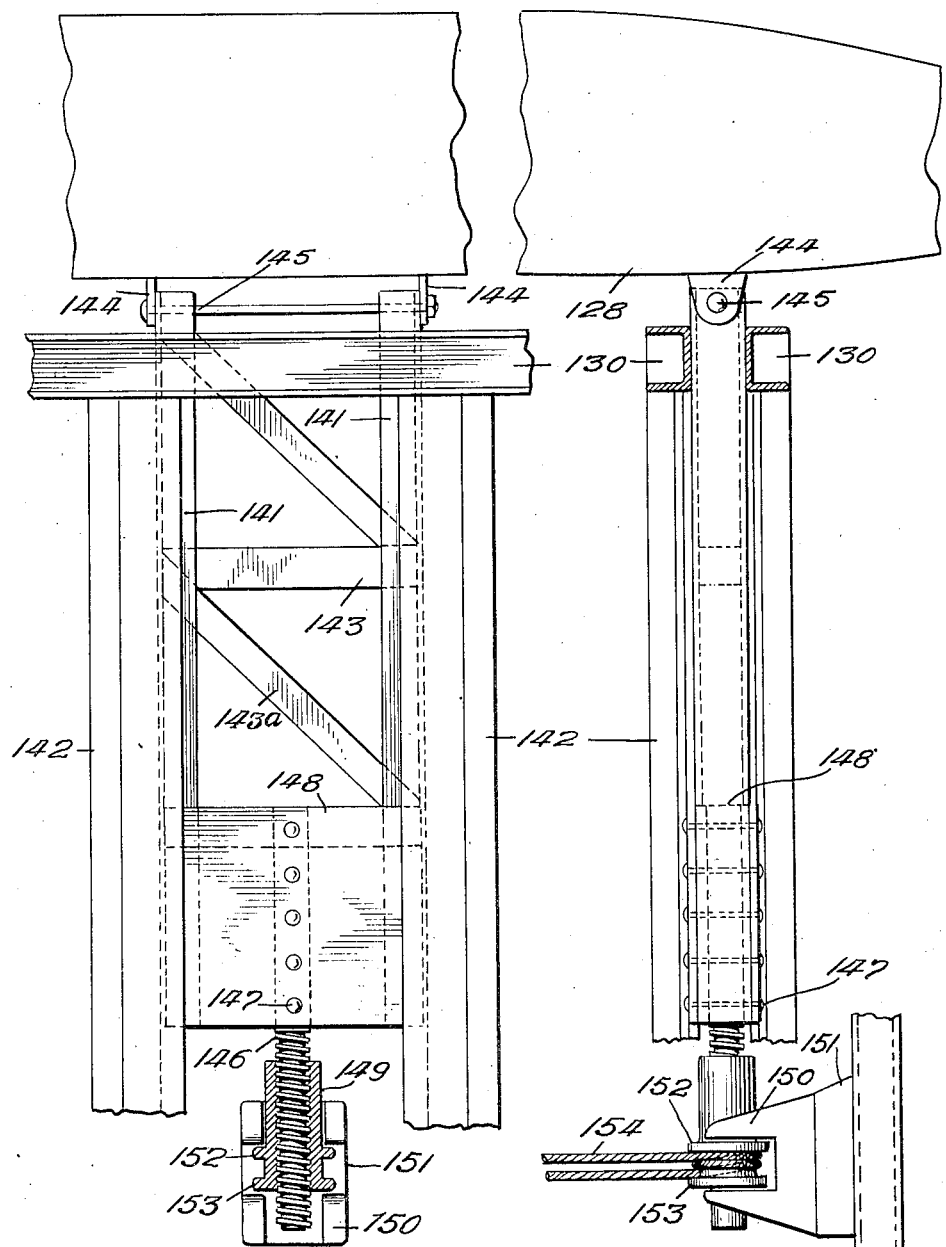

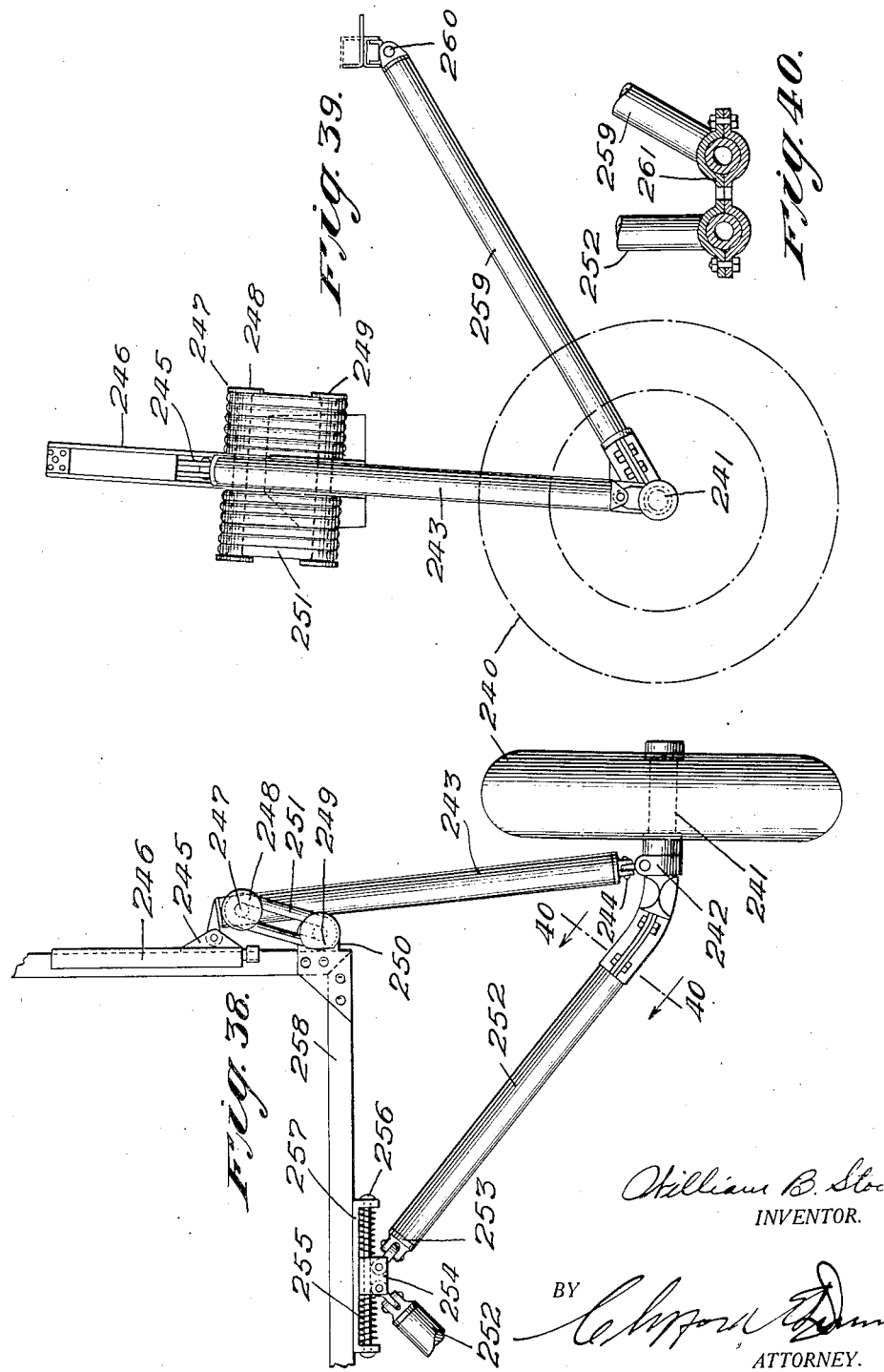

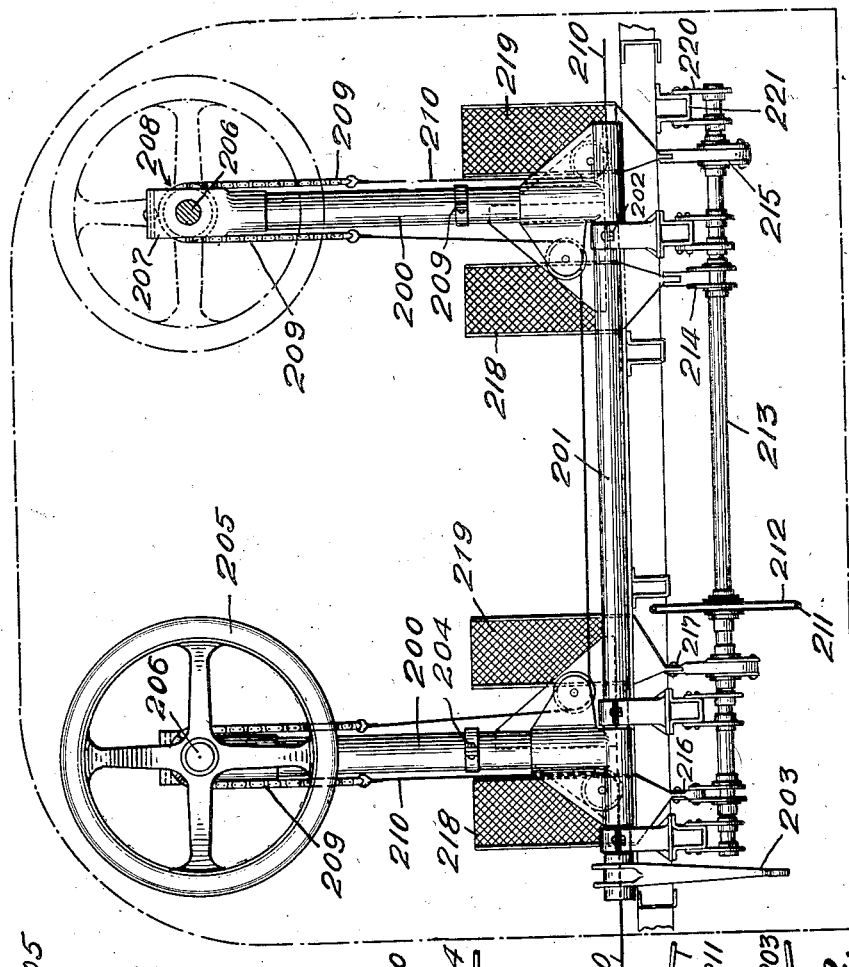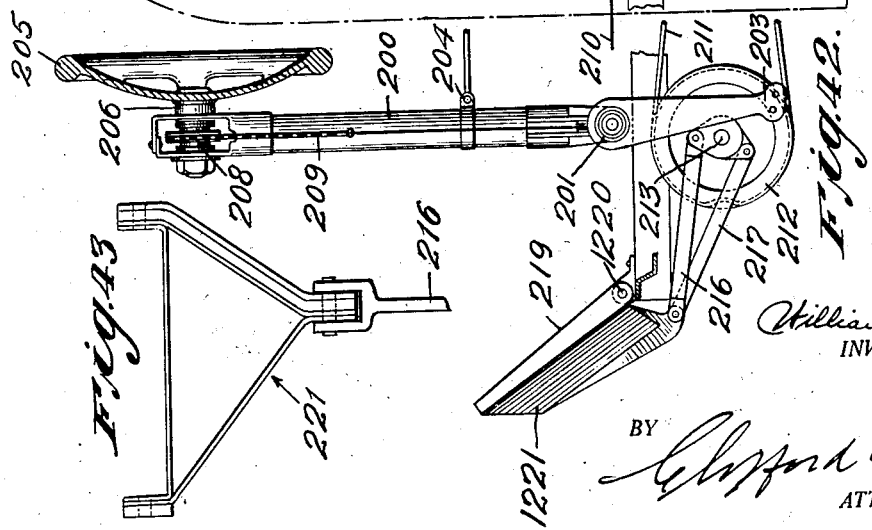

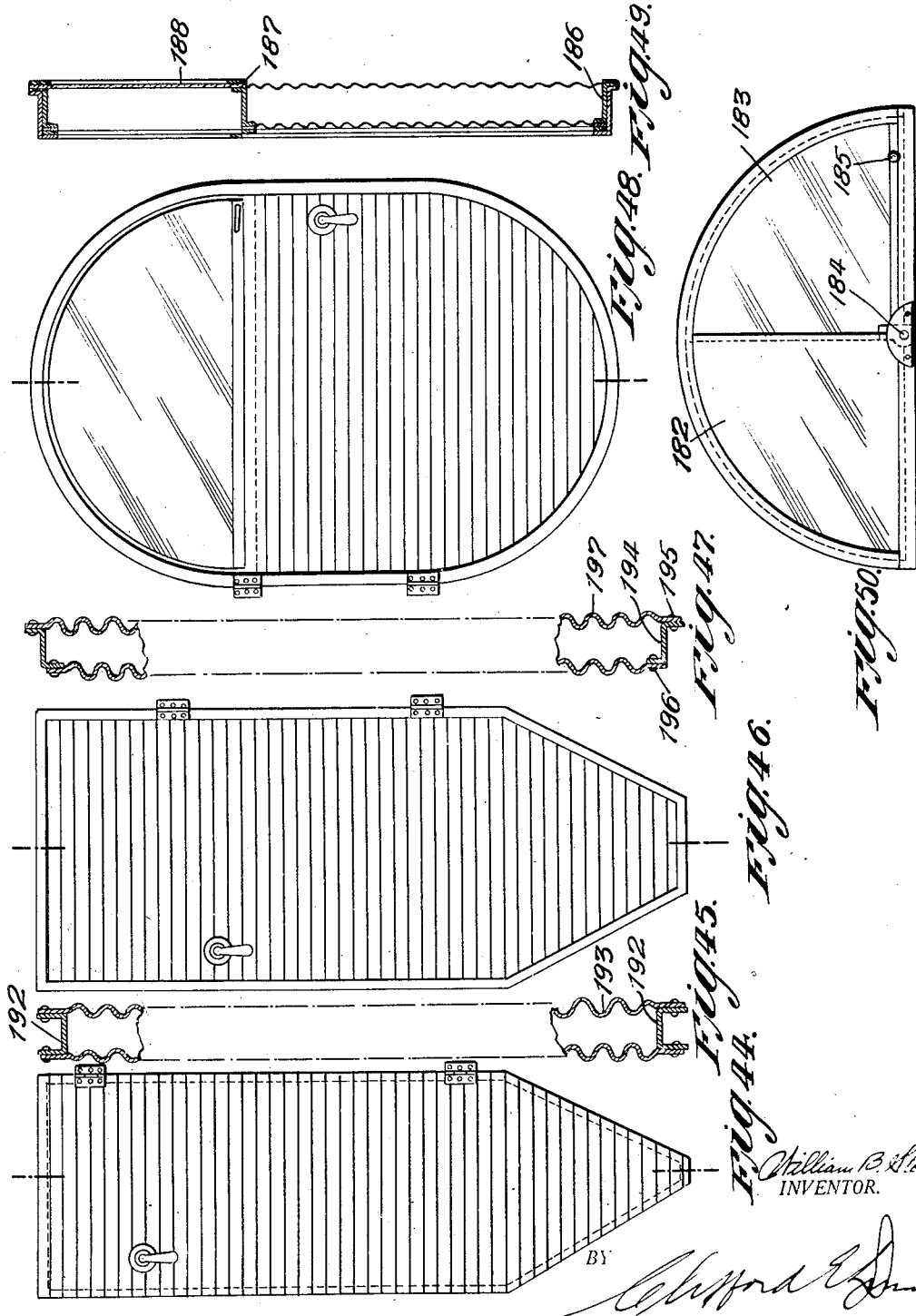

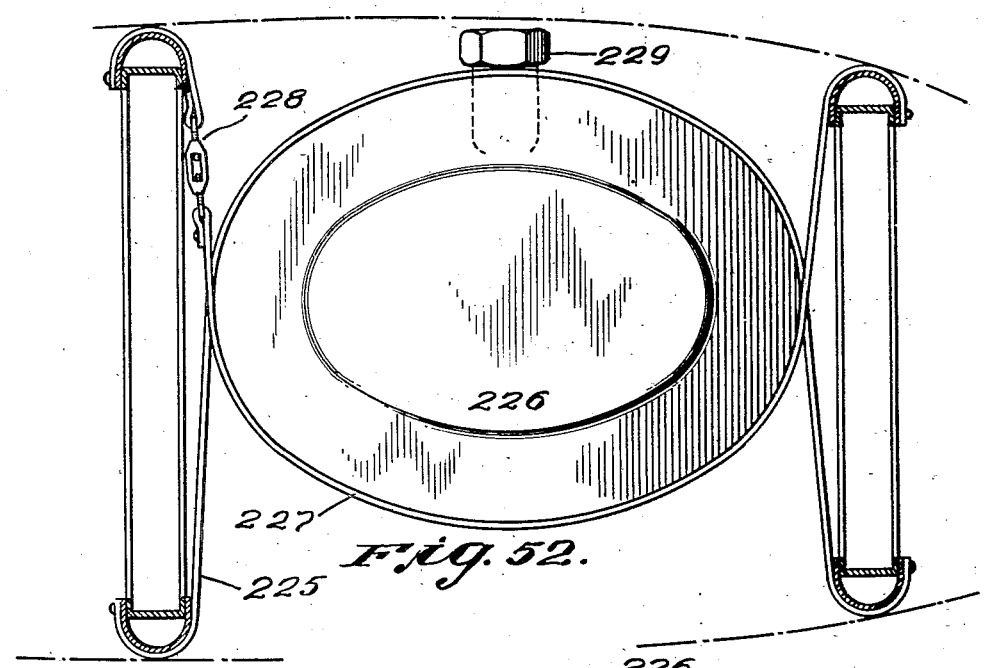
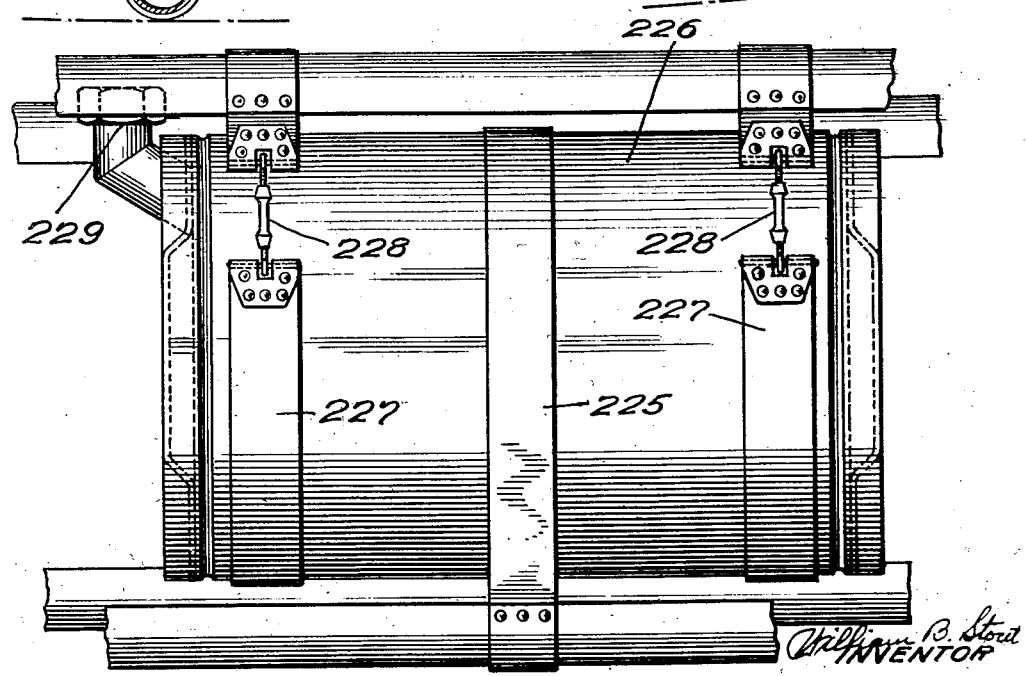

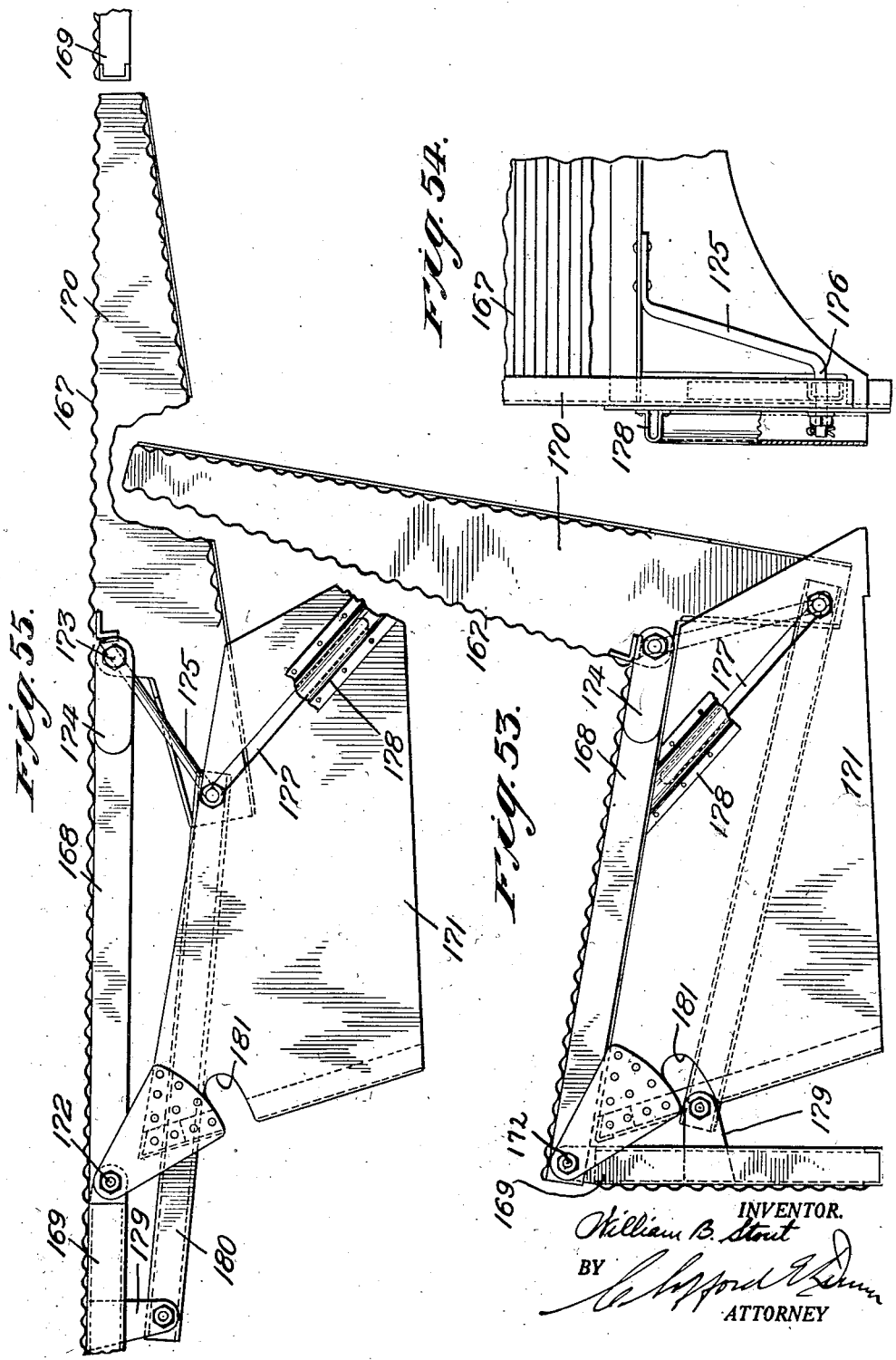

Patented Jan. 12, 1932

1,840,643

UNITED STATES PATENT OFFICE

WILLIAM B. STOUT, OF DETROIT, MICHIGAN, ASSIGNOR TO FORD MOTOR COMPANY, OF HIGHLAND PARK, MICHIGAN

AIRPLANE

Application filed July 11, 1925. Serial No. 42,944.

This invention relates to airplanes. Certain features hereof are to be found in my prior applications, Serial No. 285,951, filed March 29, 1919, and Serial No. 268,046, filed December 23, 1918, and many of these features were originally contained in my earlier application, Serial No. 233,089, of May 8, 1918.

Airplanes, being heavier than the medium through which they move, are sustained by the reaction of the air upon the wings or surfaces which are caused to move with relation thereto. A power plant supplies the force to produce this movement; and the efficiency of an airplane, that is, the amount which it can lift, depends basicly upon two factors: First, the aerodynamic characteristics, and, second, the structure.

The first involves the shape of the wings, the freedom and accuracy of the air flow as deflected by them, and the elimination of all further unnecessary and nonlifting air resistances. The second relates to the mechanical arrangement of the stressed members and parts to obtain the lightest possible weight per unit of strength—it being obvious that the lighter the structure, the greater the useful load the airplane will carry, and thus the greater its efficiency.

In airplane design, therefore, both factors must be constantly borne in mind. It is easily possible to develop a wing shape far more efficient aerodynamically than any heretofore in use, but a shape which can not be built strong enough to support the impacts and loads which are imposed in flight, would be useless. In like manner, it is easy to construct an air-foil or wing possessing ample structural strength, but such a structure is worthless for the purposes intended, unless it possesses to a sufficient degree the aerodynamic characteristics which enable it to perform its sustaining function successfully.

My present invention has for its object the production of an airplane of great efficiency, and involves a more or less radical departure from previous methods by a compromise between aerodynamics and structure. Prior to my invention, primary consideration was given to lightness of structure rather than to clean air flow; whereas my purpose has been to obtain a maximum aerodynamic advantage combined with a complete solution of the structural problems involved around the design.

As is well known, a curved or "cambered" wing possesses a much greater lift than a flat one;—within a certain range, an increase in camber producing a proportionately greater lift at flying angles. Upon the other hand, a thin cambered wing having a concave under surface at high speeds produces more head resistance and turbulence than a corresponding flat wing; and, in addition, such a wing shows a marked shift of the center of pressure, toward the rear of the plane, when the angle of incidence is small. This renders it inherently unstable. Furthermore, thin wings of whatever camber, such as were used prior to my invention, could possess little inherent structural strength; so that to obtain the necessary rigidity, resort was had to external bracing and frequently to the use of two or more wings mutually reinforced by struts, stays, wires, and the like. These, together with the body, landing gear, etc. produced resistance; and as this resistance failed to produce any lift, it has properly been termed "parasite".

The importance of this will be appreciated when it is understood that a properly designed plane will lift ten pounds for each pound of thrust. To save a pound of weight is, therefore, of small advantage compared to the saving of a pound of head resistance, which would, in theory at least, give back ten pounds of lift. In practice it has been found that in the present average biplane, approximately three-fifths of the power is consumed in overcoming parasite or head resistance.

An important feature of my invention, therefore, consists in the elimination, or reduction to a minimum, of such parasite resistance, but at the same time this object has been accomplished without substantially reducing or impairing the aerodynamic efficiency of the lifting surfaces.

It will, of course, be understood that the ultimate efficiency of an airplane, or at least of an airplane of the commercial type, means the ability to carry a maximum useful load, at desired speeds, with a minimum of power.

At the same time successful planes must also possess ample structural strength and durability.

While, as stated, thin cambered wings, possessing satisfactory lifting properties, had been developed prior to my invention, they nevertheless lacked the necessary inherent strength, offered considerable head resistance, and were susceptible of a substantial shift of center of pressure upon a change of flying angle. I have found that the thinness of the wing section is not a necessary or controlling factor in the design of an airfoil, and that a wing which I may characterize as a "fat" wing, that is, one having a very substantial thickness, especially at the root, and sufficient to enable the inclusion between its surfaces of all necessary structural parts, may be designed, which will have a satisfactory lift factor, and at the same time offer no more, and in some cases even a reduced, head resistance; and such a wing will also be susceptible of a reduced or moderate shift of center of pressure at flying angles. Such a fatness of wing is per se new; and, further, the new wing is radically distinguished from the former practice, in that the lower surface or at least that portion thereof near its leading edge, is preferably filled out or, as illustrated, even convexly curved.

In practice, I prefer to employ a wing having its medium line curved to follow a conventional camber, but having a substantial thickening of the cross-section upon both sides of this median line, to a point where the lower surface ceases to be concave or even becomes convex. In such a structure, the air can flow freely around a highly cambered curve, without the disadvantage of a wide center of pressure movement, or undue resistance or turbulence, at substantially all flying speeds, such as is produced by the heavily concaved lower surface of a conventional thin wing at high speeds.

In the case of a thin wing having a highly concave lower surface, the resistance or drag produced by such whorls and turbulence in the under cavity of the wing at high speeds, is most substantial; whereas in my novel form of wing, this resistance or drag is reduced to a minimum, at all normal flying angles, and without substantially impairing the lift. Air striking the leading edge of wing of the fat-type, such as I prefer to employ a wing is partially deflected upwardly, producing a partial and lifting vacuum above the upper surface. The contour of this surface is such that, before the reaction or compression of the air thus displaced forces it back to its original position, the trailing edge has passed beyond its influence. On the other hand, that portion of the air which is deflected downwardly by the forward convex lower surface is compressed by the weight of the machine, so that no vacuum at this point can occur, and the contour of the remaining portion of this surface is such that, at all normal flying angles, no substantial vacuum or drag can be produced, the air flowing smoothly along the under stream-lined surface until it passes off the trailing edge still under pressure, and hence without turbulence, burbling or cavitation.

It is particularly important that the curvature of the front lower half of the wing be convex, as thereby the air-flow at this point will be smooth and free from turbulence and vortices, even at high speeds and small angles. Such a wing provides a substantial increase of the speed range of the air-foil, with given power, as well as decreasing the shift of center of pressure fore and aft on the wing with change of angle of attack, in take-offs, landings, and normal flight.

I have found that this thickness or fatness of the wing is not only a definite aerodynamic advantage, but also a distinct structural advantage in that the wing may be made thick enough to house between its surfaces all of the structure necessary to support the direct loads in flight, and for trussing to give the necessary and fundamental torque rigidity which this type of wing basicly requires as a preventative of wing flutter at and near the tips.

By the use of such a wing, it is possible to eliminate or minimize practically all exposed non-lifting parts while still embodying ample strength; and, in the case of large planes, the thickness of the wing may be sufficient to house therein not only such structural parts, but the engine, pilot, passengers and useful load as well.

Another feature of importance is that of stability. The air through which an airplane moves is a thin and highly compressible medium, and the suspension of a plane therein is, therefore, of a most elastic character. Nevertheless, by reason of the moderate shift of center of pressure on change of flying angle possessed by my form of wing, and by reason of other novel characteristics which will be hereafter more fully explained, my airplane possesses not only structural strength and aerodynamic efficiency but to a high degree the properties of inherent stability as well.

Another feature comprises the provision of a practical structure of the character described which, while possessing the desirable aerodynamic characteristics, is capable of withstanding the various stresses to which the plane is subjected, with a minimum of weight. To this end each service to be performed is placed, whenever possible, upon some member which is already present for some other consistent purpose. In this manner the maximum value of all of the material is obtained or, to put it in another way, the service is performed with a minimum of material, a matter of especial moment when a maximum of lightness and strength are required.

Other novel features of my invention that may be mentioned are, the construction of a wing wherein an aerodynamic surface, and rigidifying instrumentalities for such surface, constitute but a single element; the utilization of the wing surfacing material as a structural element in the construction; and the employment of an inherently stiff and rigid material for the air-foil cover member, such material having in and of itself some appreciable resistance to warp, droop, twist, or other deformation.

Another such feature is to provide a fat wing stucture including a plurality of these inherently stiff and rigid aerodynamic or lift-surface sheet or plate elements, in combination with auxiliary spacing and bracing means inside the cover, and preferably also in combination with auxiliary deformations thereof. Preferably, said auxiliary means will include a frame-work of the skeleton type and also elongate deformations of the sheet or plate elements. Such elongate deformations will hereinafter, for convenience but not for limitation, be referred to as corrugations. The elongate elements of the frame-work and the sheet elements of the cover may be so arranged and connected that the frame-work not only braces and rigidifies the cover, but is itself braced and rigidified by the cover.

I find it practical to take substantially all of the torsional strains in the surface material itself, reinforced as it is against buckling by the longitudinal spars and framework. This throws upon the longitudinal spars practically only the flexure stresses, thus making it possible to eliminate, at the rib, cross-bracing of the framework against torsion strains. This results in a very great saving of material and weight, at the same time the firm connection between the surface and the spars causes them, together, to form a truss in which the skin performs the function of the circumferential tension and compression members. At the same time, the skin assists materially in tying the upper and lower chord members together in a truss to withstand the flexure strains.

Another such feature is to provide as wing parts, a plurality of wing sections, each constructed according to the foregoing principles, but adapted for complete sub-assembly, and for subsequent securement to another section or other sections, to make up the complete wing. Heretofore, the complete airplane wing has been fabricated as one unit; because the stiffness and rigidity of the wing equipment has been dependent on anchoring such wing to other parts of the plane by external stays and struts. According to the present invention, however, each section really becomes, as soon as sub-assembled, a stiff internally braced flattened tube which in and of itself rigidly resists compression and torsion as well as tension stresses.

Another such feature is to provide exceedingly light-weight and practically completely non-parasitic connection-fitments. As the invention is preferably carried out, some of these fitments are internal and some external.

Another such feature is to provide a wing-structure wherein all or certain of the elongate elements making up the internal framework will have such cross sectional shapes that there subsists a mutually fortifying action and re-action between the sheet elements, and the elongate elements, arising not only from the inherent stiffness and rigidity of these elements, but also form their respective shapings.

Another such feature is to provide a fat wing-structure carrying an internal framework having a plurality of rib-structures in combination with a plurality of spar-structures. By "rib-structures" is meant structures running generally in a fore-and-aft direction; and by "spar-structures" is meant structures running generally spanwise of the wing.

Another such feature is to provide a fat wing-structure provided with an internal frame-work having a plurality of rib-structures which include merely a plurality of rib-struts, certain of which, at least, are connected to the wing cover other than by way of rib-beams.

Another feature is to provide a fat wing as last described, and one including an internal frame-work having also a plurality of spar frame-work having also a plurality of spar-structures including spar-beams; the arrangement being such that the rib-struts and the spar-beams coact to mutually fortify each other, thereby to increase the mutually fortifying action between the frame-work as a whole and the wing cover.

Another such feature is to provide a pressure-shaped spar-beam which progressively decreases in cross-sectional area and hence in weight per lineal unit, from wing root to wing tip, and yet maintains the same general cross-sectional dimension from end to end.

Another feature is to provide a trussed-spar made up chiefly if not wholly of pressure shaped elongate members all having cross-sectional shapes of the same general class but of dissimilar cross-sectional areas, and so arranged that a spar is provided which decreases in weight from root to tip of the wing and yet is of substantially the same stiffness and rigidity in proportion to load all along the span of the wing.

Another feature is to provide a spar-element including elongate or chord members as described just above but with all the dissimilar cross-sectional areas of certain groups of the elongate members resulting solely from subjecting strips of sheet material of dissimilar thickness or gauges to the same equipment of rolls, presses or other formers. Rolls may for convenience be used, and have been used when the strips of flat material are made of a metal such as duralumin.

Thereby another object of the invention is attained, which is to provide a method of inexpensively building up any strong yet light weight bracing frame-work for a fat wing-structure. According to this method, there are first provided strips of flat material of different thicknesses but so thin as to be highly flexible in the flat condition. Such strips are laterally shaped by subjection to the forming equipment aforesaid, to produce elongate members resistant to ready distortion in any transverse direction. Finally, these members are arranged and connected into a frame-work characterized by the disposition of the members made of flat material of lesser thicknesses in locations opposite the portions of the wing receiving the lesser air stresses when the airplane is in flight.

A further feature is to provide a wing-structure so shaped that each spar-beam directly underlying the upper wing covering may define a straight horizontal line, to give the wing great strength; and, at the same time, a wing of relatively great depth at or near the fuselage will be established, for aerodynamic efficiency, and yet a wing dihedral-angle provision will be incorporated, for insuring natural lateral stability.

Whenever it is desired to form the new wing structure so that it shall be, in the highest degree, a stiff internally braced tube which rigidly resists compression as well as tension stresses and particularly torsion stresses, the corrugations aforesaid may be present to form a part of the combination; because then the corrugations of the sheet elements, and the elongate elements of the frame-work, may also be so relatively located that the cover as such, the corrugations in and of themselves, and the different parts of the frame-work, are all both directly and indirectly mutually reactant. Such a wing will possess a rigidity and strength such that there will be substantially no distortion or warping of the wing produced by aileron action, or by change of angle of incidence at the wing tip at different angles of attack of the plane. Then, too, there will be no tendency toward wing twist due to movement of the center of pressure or otherwise, and no tendency toward wing breakage or weakening due to upward air pressures on the under side of the wing. Moreover, all these advantages and others will be present in a fat wing of low weight and of high load-carrying capacity.

Such fat wing may also be of low aspect ratio when desired.

Also, the new wing may be made of great depth near the central portion of the plane, and hence of great "hold" capacity in the vicinity of the usual fuselage, to accommodate the mounting of an engine equipment of the requisite power for commercial work, and to give great capacity for carrying freight or passengers or both; yet the wing may have a sharp depth taper toward the wing tip. Such sharp taper is preferable, because thereby, as the wing tip is approached closer and closer, less and less weight per unit of wing surface is present. And the more the weight of the thinner parts of the wing is reduced, the more also may be reduced the thicker parts of the wing, without sacrifice of rigidity or strength.

Another object is to provide a combined wing and fuselage arrangement, characterized by the provision of a wing equipment including in effect a single fat wing so constructed that the same may suspend the fuselage from the middle of the wing; and, in this connection particularly, another object is to shape the wing so that all spar-beams, at the bottom as well as at the top of the wing, may define straight lines. In a construction satisfying both these objects, many important advantages accrue. The wing-equipment being attached to the top rather than at the sides of the fuselage, there is permitted a marked reduction in weight of the compression resisting members for holding the wing-equipment in place without crushing the fuselage. The wing itself is of great strength, due to the spar-beams being neither bent nor curved. The single wing in effect provided may at its rear upper middle portion merge smoothly into the top of the fuselage. Such wing, nevertheless, may be made much deeper at opposite sides of the fuselage than at the wing-tips. The wing, too, may have its spar-beams at the tops of the wing extending in straight horizontal lines, from wing tip to wing tip, and yet the wing may be so shaped at its bottom as to make the aforesaid dihedral-angle provision. A minimization of the total area to which covering material must be applied, is also accomplished as the result of these various features.

Another object is to provide a wing so shaped and proportioned that the average center of pressure of the wing is always located in a substantially straight line from root to tip of the wing, such line substantially perpendicular to the fuselage, at the angle of attack proper to straightaway flight at a given altitude.

Another object is to provide a hollow wing so shaped and proportioned that the shift of the center of pressure at varying angles of flight will not substantially exceed twenty-five to thirty percent of the chord length.

Other novel features of my invention will become apparent from the detailed description hereinafter given and I will now proceed to describe one form or embodiment of my invention, which is illustrated in the accompanying drawings forming a part of this application. I wish it to be clearly understood, however, that the airplane shown and described constitutes but one embodiment of my invention or inventions, and is not to be taken as definitive or for any other purpose than that of illustration. It is obvious that my invention and its various features may be embodied in various forms and constructions, and my invention is to be understood as limited only to such features, structure or structures as are clearly defined in the appended claims.

In the drawings:

Fig. 1 is a side elevation of an airplane embodying one form of the present invention.

Fig. 2 is a diagrammatic cross-section of the propeller, the wing and the tail plane or "stabilizing elevator", showing the relation of the stabilizing elevator to the air displaced by the propeller and the wing.

Fig. 3 is a fragmentary plan view showing the fuselage and one wing.

Fig. 4 is a section on the line 4—4 of Fig. 3.

Fig. 5 is a section on the line 5—5 of Fig. 3.

Fig. 6 is a section on the line 6—6 of Fig. 3.

Fig. 6a is a fragmentary plan view of a modified wing having an aileron extending to the rear of the trailing edge of the wing.

Fig. 7 is a front elevation of the complete airplane.

Fig. 8 is a fragmentary perspective of the trailing edge of the wing.

Fig. 9 is an enlarged perspective showing the trailing edge substantially on the line 9—9 of Fig. 8.

Fig. 10 is a fragmentary section in perspective, showing the leading edge of the wing adjacent to the tip.

Fig. 11 is a side elevation of the propeller and engine housing.

Fig. 12 is a rear view of the engine housing.

Fig. 13 is a fragmentary side elevation, somewhat diagrammatic, of the pilot's compartment, which is immediately in the rear of the engine compartment.

Fig. 14 is a front elevation of the pilot's compartment.

Fig. 19 is a diagrammatic view of a wing spar.

Fig. 20 is a transverse section of the wing, at a joint over the fuselage.

Figs. 21 and 22 show details of the construction of a wing spar at the joint between the outer and middle wing sections. Fig. 21 shows the middle wing section, and Fig. 22 the outer wing section.

Fig. 23 is a vertical section through the joint formed by the parts shown in Figs. 21 and 22.

Fig. 24, is a fragmentary perspective showing a means of joining a wing spar to the framing of the fuselage.

Fig. 25 is a detail of a type of joint which may be used at the lower corners of the fuselage.

Fig. 26 is a somewhat diagrammatic horizontal section through the forward part of the fuselage.

Fig. 27 is a vertical section, somewhat diagrammatic, of the part of the fuselage shown in Fig. 27.

Figure 15:
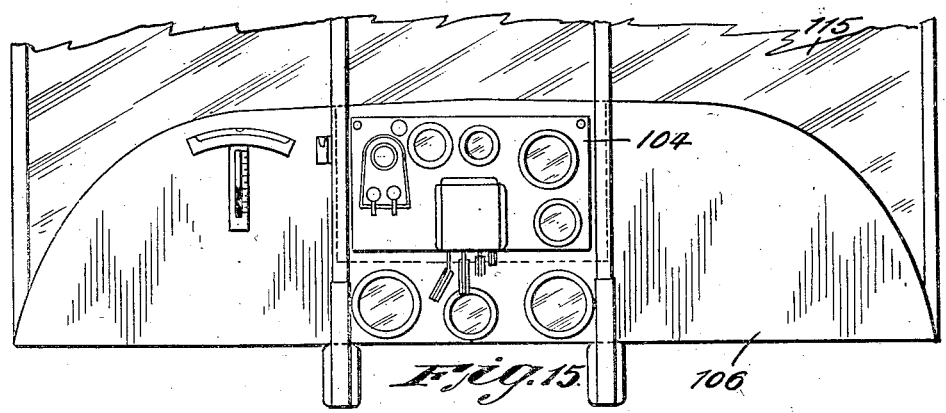
Fig. 15 is a fragmentary enlarged interior elevation of the front of the pilot's compartment and the instrument board.

Figs. 28, 29 and 30 together show somewhat diagrammatically an elevation of the fuselage frame, a fragment of the covering being shown in Fig. 30.

Fig. 31 is a section on the line 31—31 of Fig. 29.

Fig. 32 is a section on the line 32—32 of Fig. 31.

Fig. 33 is a section substantially on the line 33—33 of Fig. 29.

Fig. 34 is an enlarged detail elevation of the joint between the elevator stabilizer and the elevator.

Fig. 35 is a transverse section through the fuselage, adjacent to the tail skid, substantially on the line 35—35 of Fig. 30.

Fig. 36 is a fragmentary elevation, partly in section and transverse to the fuselage, of one form of elevator stabilizer control.

Fig. 37 is an elevation at right angles to Fig. 36.

Fig. 38 is a front elevation of one form of undercarriage.

Fig. 39 is a side elevation of the device shown in Fig. 38.

Fig. 40 is a detail section on the line 40—40 of Fig. 38.

Fig. 41 is a front elevation of one form of flight control devices in the pilot's compartment.

Fig. 42 is a side elevation of the mechanism shown in Fig. 41.

Fig. 43 is a detail of one form of rudder pedal supporting and connecting frame.

Fig. 44 is an elevation of a door which may be placed at the ends of the passenger compartment.

Fig. 45 is a transverse section through the center of the door shown in Fig. 44.

Fig. 46 is an elevation of one form of door for closing the pilot's compartment.

Fig. 47 is a transverse section through the door of Fig. 46.

Fig. 48 is an elevation of one form of side or entrance door, with window.

Fig. 49 is a transverse section through the door and window of Fig. 48.

Fig. 50 is an elevation of one form of window.

Fig. 51 is a side elevation of a fuel tank, showing one form of a device for supporting the tank within the wing.

Fig. 52 is an elevation at right angles to Fig. 51.

Fig. 53 is a side elevation of one form of pullman seat.

Fig. 54 is a detail of a seat adjusting mechanism.

Fig. 55 is a side elevation of the seat shown in Fig. 54 when adjusted as a pullman berth.

The new airplane illustratively shown in the drawings includes a wing equipment made up of different wing sections 60, 61 and 62. Such wing equipment is in effect a single wing symmetrically disposed above the fuselage. The middle wing section 60 directly suspends the fuselage, but this section is deep enough at opposite sides of the fuselage to enclose parts of the opposite sides of the latter.

Each of the wing portions 60—61 and 60—62, from where the middle section joins the fuselage to the tip of an outer section 61 or 62, represents one typical modification of the thick, internally braced and preferably double-convexed wing characterized by the slight movement of the center of pressure at varying angles of flight, another form of which is shown in my said applications Ser. Nos. 285,951 and 233,089.

As shown in Figs. 2, 4, 5 and 6, each of the wing portions 60—61 and 60—62 is also constructed to incorporate the essential characteristic as to fore and aft shaping, of the wing shown in said applications Serial Nos. 285,951 and 233,089.

In this connection, it is pointed out that airplane wings have formerly been made with concave, or upwardly arched or cambered lower surfaces, with the object of increasing lift. The present wing, it will be noted, is not only convexly cambered at the top but may also be convexly cambered in part at the bottom. The maximum depth of the wing is preferably about one-third of the way back along the chord. The convexity of the under surface may in some cases approach or even equal that of the upper surface, as shown in said application No. 285,951, or the convexity of the under surface may be substantially less than the convexity of the upper surface, as in the embodiment of the present application and that of application No. 233,089. But some convexity of the under surface is desirable for many purposes, so far as my actual flights have shown.

In still other respects the wing of the present airplane constitutes a modification within the disclosure of said application Serial No. 285,951, in that said wing is a cambered fat wing having raked leading and trailing edges, and with said edges negatively and positively raked, and negatively and positively raked according to dissimilar angles.

The leading edges of the wing have a positive rake, as clearly shown in Fig. 3, while the trailing edges have a negative rake. By this construction a loss of lifting surface due to eddies and outward deflection of the air stream is minimized, if not completely eliminated, the air stream leaving the trailing edges of the wing at the most effective angles thereto, throughout the length of the wing.

The rake of the forward edges is substantially one-half that of the rear edges, so that the loci of all points substantially one-third of the way back from the leading edges are on a straight transverse line, which results in the fact that the normal center of pressure on the wing is located in a substantially straight line from tip to tip of the wing, this line being substantially perpendicular to the fuselage. The line of the normal center of pressure may thus be said to be neutral, having neither a positive nor a negative rake.

To explain this more fully: At high speeds, the center of pressure moves back on the wing, because of small angles of attack, and naturally further backward on that part of the wing having the greatest chord length. This means that, at high speeds, the line of pressure on the wings has a negative rake, a condition of no disadvantage on account of the high speed and great volume of the air on the controls, rendering them extremely sensitive to any movement on the part of the pilot. The critical moment of controllability is on landing, and when, at that period, the plane is set up at its supposedly steepest angle of lift, the center of pressure moves forward. Since it moves further forward at points along the center of pressure line where the chord is longest, the center of pressure line gradually bends back at both sides to incorporate a line of positive angle or rake at each side of about the center of the wing section, like the point of an arrow; thus giving an ideal action at the moment of landing, when the controls are least sensitive, which is most important to the pilot. At normal medium angles of attack, during normal lines of flight while "on course", however, the center of pressure line is substantially straight from wing tip to wing tip, a condition of maximum stability.

In still other respects, the wing here shown constitutes a modification within the disclosure of said application Serial No. 285,951.

The prior applications, Serial Nos. 285,951 and 233,089, disclosed this general subject matter, and in that respect the present application is filed in lieu of those applications.

As already pointed out, the wing portions 60—61 and 60—62 at opposite sides of the fuselage are deep enough to enclose parts of the sides of the latter. These wing portions, furthermore, decrease in depth towards the wing tips. The top surface of the wing at its highest point is a substantially straight line from tip to tip of the wing, while the bottom surface, and the leading and trailing edges, slants upward from opposite sides of the fuselage toward the tips. This construction contains an unusual combination of advantageous features, as already pointed out a dihedral angle of the lower wing surfaces is desirable to secure inherent lateral stability, whereas a dihedral upper surface causes eddies in the air which reduce the vacuum above the wing, and consequently impairs the lift. When the wing is transversely flat, approximately two-thirds of the lift is derived from the upper surface. Thus, as already pointed out, the wing of the present invention combines the aerodynamic advantages of a dihedral wing, and the structural advantages of a wing having a transversely flat upper surface. Moreover, this construction permits the use of upper spar-beam compression members which are straight from tip to tip of the wing. This is a marked advantage, since the bending of any member greatly reduces its compression strength. The necessary strength in the straight upper spar-beams can thus be secured with much lighter members. The wing of this invention thus presents a most desirable and advantageous combination of natural stability, structural strength and aerodynamic efficiency.

The present invention thus provides a tapered air-foil which has a thick or deep root portion and a thin or less depth tip portion; and also one which throughout practically its entire span sweeps back along its entering edge and also forward along its trailing edge, and which at any chord line, from root to tip, is of like depth at two points, one forward and the other aft on such chord line, these points being reduced in fore and aft spacing as the chord lines are located closer and closer to the wing tip.

The surfaces of the ailerons 661 are practically continuous with the wing surfaces. To this end, the forward edge of the aileron is of substantial depth while at the trailing edge the upper and lower surfaces meet at a small angle.

The trailing edge of the aileron can either be in line with the trailing edge of the wing as shown in Fig. 6, or extending outward therefrom in cases where larger aileron surfaces are desired, as shown in Fig. 6a.

The present invention further comprises the discovery that with a wing as just described, the tail appendages, comprising the elevator 67 and the elevator stabilizer 68, which will be hereinafter more fully described, are substantially out of the path of the disturbed air displaced by the wing. The path of the displaced air, as determined by wind tunnel tests, has been shown diagrammatically in Fig. 2, and it will be noted that the horizontal stabilizer, being placed above the plane of the chord line of the wing, does not encounter the air displaced by the wing. This fact may account in part for the superior controllability which characterizes the airplanes of the present invention, one type of which has been illustrated.

The present invention further contemplates a wing structure which will be continuous over the fuselage, and adapted to be articulated to the fuselage, to readily detachably, yet securely, suspend the latter, thus to avoid crushing strains on the fuselage; and also a wing structure which, at its central part overlying the fuselage, provides fuselage extra-headroom for a variety of useful purposes, one or more of which will be mentioned hereinafter. The framework of the wing, or at least of the fuselage-overlying part thereof, is preferably continuous over the fuselage.

Also, as previously disclosed in the said applications, Serial Nos. 285,951 and 268,046, in lieu of which the present application is filed, the new wing, when assembled, constitutes a wing cantilever; that is, it is held to its predetermined hollow shape by an envelope including an upper and lower wing covering of inherently stiff and rigid material, as well as by an internally stiff and rigid framework. Each of the wing sections 60, 61, and 62, as disclosed in the present invention, is unit-fabricated according to the same principle, so that they also shall constitute wing cantilevers or, more properly, wing section cantilevers.

Furthermore, as also disclosed in said applications, the new wing comprises a cover and a contained framework, both made preferably of the same material. While in any of my applications any suitable material may be employed, the specific illustration of the invention in the present disclosure proposes the use of metal, in accordance with the practical construction of the airplane applicant is now flying. Furthermore, the present embodiment contemplates the use of one and the same metal, or of metals having equal temperature coefficients of expansion, and preferably a rust-proof metal or metals, for all frame members covering members, fittings, and even rivets throughout wings, engine compartment, fuselage and appendages. By using the same metal, or metals having equal temperature coefficients of expansion throughout, stresses due to unequal expansion and contraction with variations in temperature are minimized or eliminated. The advantage of this invention is apparent when the temperature variations to which an airplane is subjected upon every ascent to practicable flying altitude is considered. When different frame members, or the frame and the covering, have different coefficients of expansion, stresses are induced which may warp the structure or even cause fatal accidents. Furthermore, even if the airplane withstands these unusual stresses, fastenings are loosened by the repeated expansion and contraction, producing local vibration and seriously weakened joints.

A light metal of high tensile as well as compressive strength, particularly when intended to be rolled into sheets and elongate or bar-like members of desired shapes, should be selected. Aluminum and its alloys, particularly the alloy commercially known as duralumin, have been found to be eminently satisfactory.

A fuselage so constructed is partially shown, as to its structural details, in Figs. 1 and 3 and Figs. 26 to 35. This fuselage not only includes a housing or covering envelope of sheet material but also a bracing, rigidifying and load-supporting framework for coacting with the envelope pursuant to the invention. This fuselage and many of its features form the subject-matter of my copending application Serial No. 122,758, filed July 16, 1926, although hereinafter a fairly detail description of the same as here illustrated will be given.

The internal frame or truss work of the wing or other body of the airplane having an air-reactant surface in flight, may be arranged in any suitable or desirable manner consistent with the requisite factor of safety as to strength, and minimum weight.

Referring to the illustrated wing-cantilever 60—61—62, the same, and also its wing-cantilever sections 60, 61 and 62, will now be described with more particularity as to structural detail.

As shown in Fig. 20, the wing may comprise a number of main spars, and several secondary former spars which are suitably interconnected to strengthen the wing both in the direction of flight, and in the direction of the length of the wing. Fig. 19 represents a typical side elevation of one of the spar-structures shown in end elevation in Fig. 20. The spar-structures shown in end elevation in Fig. 20 are the three main spar-structures, 69, 70 and 71, one forward secondary spar-structure 72, two secondary or former spar-structures 73 and 74 intermediate the main spar-structures, and two secondary or former spar-structures 75 and 76 for the support of the trailing edge as shown in Fig. 20.

The different spar-structures will of course be made of such different and changing depths along their lengths as to give the wing the proper external shape.

Each of the main spar-structures includes upper and lower chord members 1170 of rolled metal. Figs. 21–24 illustrate a composite chord member formed of two shaped elongate members a U bar 77 having a channel 78 inserted therein, the cross section of the assembly resembling the letter D.

The two upper and lower chord members of each spar-structure (Figs. 14 and 17) here are interconnected by vertical spar-struts 79 and diagonal truss members 80, the members illustrated being channels. Consequently, said spar-structures are here really trussed-spars. In other words, there is provided a truss adapted for use especially as airplane wing spars, comprising upper and lower box-section beams built up from strips of sheet material joined by struts placed at intervals between said beams, and braces between said struts; said braces and struts being extended at different angles; and the various parts being pinned or riveted together, with the struts and braces preferably thus secured direct to the beams also preferably extending into the beams. Thus, referring to the various views appearing on the same sheet with Fig. 19, the latter shows such a truss, made up of box-section beams or chord members marked 1170 joined by dissimilarly extending struts and braces 79 and 80.

The secondary spar-structures 72, 73, 74, 75 and 76 comprise much lighter chord members 81 preferably flanged to better support the wing covering sheet; and the upper and lower chord members are interconnected by vertical and diagonal spar-struts similar to those shown at 79 and 80 in Figs. 19 and 22. So that said secondary spar-structures are also trussed-spars.

All these trussed-spars are also interconnected, strengthening the wing in the direction of flight, by vertically and diagonally extending rib struts 82 arranged in fore and aft planes.

The provision for the interior of a hollow airplane wing, of a trussed frame-work including the combination of spaced spar-beams, spar-struts between these chord members to make a plurality of horizontally spaced trussed-spars, and rib-struts between these trussed-spars, to make a frame-work cross-trussed as well as trussed along the wing span, is a modification of the same type of frame-work shown in my said application Serial No. 285,951, which was filed in lieu of and contained the same general disclosure as, my application Serial No. 233,089; and so, in this regard, the present application is also filed in lieu of the application last-mentioned. Thus there is provided a composite structure including a supporting frame-work having fore and aft contour determining or affecting ribs, comprising "spar-beams" as they are called here, to which the covering material is secured. It is obvious that such covering applied to said composite structure, may be removed for replacement or renewal, in whole or in part, without disturbing or in any way affecting the internal frame-work, so far as interfering with the complete restoration of the entire structure as a torque resisting unit on replacing or renewing a cover part, thereby adding materially to the durability and permanence of the plane as a whole.

Since both the wing chord and the depth decrease from the fuselage toward the wing tips, the main and secondary spar-structures converge toward the wing tips, as indicated in Fig. 3, in regard to main spar-structures 69, 70 and 71, and also decrease in depth, as illustrated in Fig. 19.

Since the necessary strength and rigidity for the wing tip can be secured with comparatively light elongate members for the frame-work, and the strength of the members must gradually increase toward the fuselage, the present invention contemplates the use for any or all of the frame-work parts, of stock which varies progressively in weight and strength, from the fuselage toward the wing tips. The desired variation may be brought about by decreasing the thickness of the metal of the shapes used for different frame-work members toward the wing tips while preserving the same shapes and exterior dimensions. By this means excess weight is avoided, and the lifting capacity of the plane is increased.

For instance, in Fig. 19 a spar-structure is shown comprising a joined pair of spar-structure sections, each of which represents a unit-fabricated length of say the spar-structure 70 of Fig. 20, and each of which forms that part of the spar-structure to lie within one of the two wing-sections 60 and 61 or 62 (Fig. 3). Such a spar-section coacts with the inherently stiff and rigid covering of its wing section to make the wing section, especially when the spar-beams of the contained spar-sections are riveted to the covering, substantially a rigid internally trussed, flattened tube which rigidly resists tension, compression and torsion stresses even before being assembled into the complete wing, and which, when coupled to one or more of its fellows to make up such complete wing, performs its part in resisting not only tension and compression stresses but also torque stresses due to shifting of the center of pressure while the airplane is in flight and when the angle of attack is varied sharply.

It being contemplated that the wing structure shall be continuous over the fuselage, means are provided for securing the wing frame directly to the fuselage frame. For this purpose each main spar-structure 69, 70 and 71 may be provided with one or more pairs of gusset plates 83, (Figs. 19, 20 and 24) suitably secured to the lower chord members 1170 and depending therefrom, to be secured to fuselage frame members, as the longerons 118 and their forward extensions 1180.

As indicated in Figs. 1, 3, 7, 16, 17, 30 and 44–49, all the various air-engaging bodies or sub-divisions of the airplane are in the present instance covered with corrugated sheet material, such corrugations extending generally in a fore and aft direction or in the direction of general air flow. This material is an inherently stiff and rigid material pursuant to the invention; incorporated not only to provide highly efficient air-foil surfaces, but also to coact with a contained skeleton frame-work, of similar material, in bracing and rigidifying the sub-division, and consequently to aid in the production of a complete airplane of maximum strength and load-carrying capacity, and of maximum maneuverability and safety under all conditions, and yet of minimum weight. In other words, various sub-divisions other than the wing equipment are shown constructed so as to include a cover of said inherently stiff and rigid sheet material, preferably corrugated along the lines of air flow; such sub-divisions for instance, as the horizontal stabilizer 68, the elevator 67, the rudder 125, the various portions of the fuselage, &c.

The wing equipment of the airplane shown in the drawings is such that a plurality of wing sections 60, 61 and 62, are, for convenience of assembly, transportation and storage, constructed as unit-fabricated sections which are easily assembled and disassembled. Each of these sections comprises a cover made of the inherently stiff and rigid sheet material of the invention. This cover is corrugated top and bottom, generally in a fore and aft direction, and is thus also corrugated, in the present case, generally along the lines of air flow. These corrugations further, it will be noted, in the present embodiment extend parallel to the rib-structures (see the component elements of one possible such structure, in Fig. 20), and hence at right angles or substantially at right angles to the spar-structures, which latter structures, as explained above, include not only struts, but upper and lower chord members (see the component elements of one possible such structure, in Fig. 19). These spar-beams and the corrugations of the wing cover, together form auxiliary and substantially flat framework units, independent of any of the spar-struts or wing-struts within the main framework. These frame-work units, being located at the top and bottom surfaces of the finished wing, may be termed the top and bottom skeleton-frames.

Any number of sheets may be used in making up the cover for each wing section. To this sheet or sheets, abutting or contiguous portions of the elements of the contained frame-work are riveted or otherwise secured, directly or by way of sheet material crown-pieces, gussets or the like, during building up of the wing section. As will be seen from the drawings, the arrangement is such that all the wing sections may be built up by successively applying the different rivets in such manner that every rivet may be inspected at opposite ends as it is headed into place, and thus all subsequent dangers from improperly headed rivets are obviated.

So far as possible the wing-cover sheets, whether corrugated or not, should be continuous over the leading edge of each wing section. As will be seen best from Fig. 3, the sheet for the wing section 60 is continuous over the entire leading edge; while the sheet for the outer wing section 60 or 61 is continuous over only a part of its leading edge. Toward the wing tips, that is, toward the tip adjacent parts of the outer wing sections, the angle at the leading edge is too severe to permit of properly shaping the sheets, if corrugated, without buckling. In order to overcome this difficulty, the upper sheet marked 87 in Fig. 10 is connected to the lower sheet 88 by a suitable curved strip 89 which may be riveted to both upper and lower sheets. At the trailing edge of each wing section, the corrugations of the upper and lower sheets are in the present instance shown as being superposed—except of course, at the central part of the trailing edge of the wing section 60 where it overlies the fuselage covering. These trailing edges, in the construction illustrated in the drawings, are shown as being directly secured together, by suitable means, such as rivets 90, passing through the sides of the corrugations as shown in Figs. 8 and 9. According to this arrangement, the material of the upper and lower cover sheets for the wing sections are juxtaposed and inter-nested at the trailing edges; although it might be equally advantageous to flatten the trailing edge margins preparatory to securing together said edges, either directly or to a suitable intervening edge-strip.

It is pointed out that not only does the skin or cover of the new fat wing structure act as a very smooth-surfaced and otherwise highly efficient air-foil means, but also, in a fat wing structure, such cover is a peculiarly necessary structural element or means for strengthening such structure in a spanwise direction as well as in a fore and aft direction and consequently all over. This is true even with such skin or cover constructed or built up of sheet material of the stiffness and rigidity herein specified but not corrugated or otherwise locally deformed. It is explained that, when the inherently stiff and rigid cover is attached to both spar-elements and rib-elements, it performs what I may term the master function of carrying and equalizing stresses in all directions, including stresses transverse to its depth and even diagonally through its depth. And when the cover is corrugated or otherwise specially deformed at different points in accordance with the preferable mode of carrying out the invention, say as illustrated in the drawings, the wing structure is not only given an increased aerodynamic efficiency, but really extraordinary strength is added to the wing structure by increasing the strength of each spar-structure as such and the strength of each rib-structure as such.

Attention is also directed to another feature of construction of the spar-structures, and one constituting an important feature of the invention. This is shown most clearly in Fig. 19. Such feature involves making up each spar-structure or spar-structure section so that the same includes, in addition to the chord members 1170, a complement of struts, all or the great majority of which are either uprights struts or struts upwardly and outwardly inclined. In the construction illustrated in Fig. 19, each spar-structure section includes along its entire length, in regular alternation, upright or vertical struts 79, and other struts inclined as just described. Thus, there are present a plurality of shorter struts, the vertical or substantially vertical ones 79, and a plurality of longer or inclined struts, arranged in a certain order lengthwise of the spar-structure. In any such arrangement, the shorter struts act as compression members and the longer struts act as tension members during flight; the compression members aiding the tension members and vice versa, further to adapt the wing to withstand those strains which are often exceedingly severe, to wit, air thrusts and impacts acting upwardly on the under sides of the wing.

Figure 16:
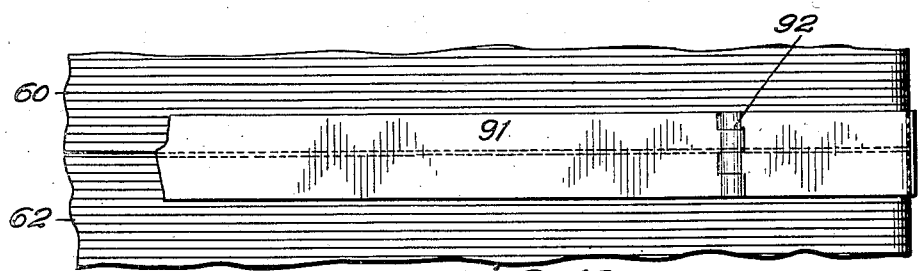
Fig. 16 is a fragmentary detail plan of a wing joint covering band.
Figure 17:
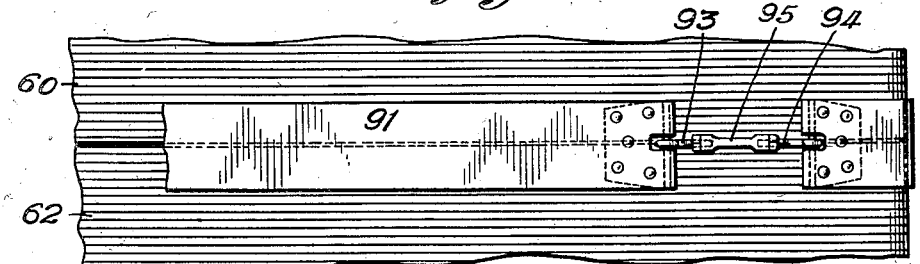
Fig. 17 is a fragmentary inverted plan showing the means of securing the ends of the joint covering band.
Figure 18:
Fig. 18 is a fragmentary elevation of the joint covering band.

In order, when the wing sections are assembled into a complete wing, to provide covering means for joints between the different sections, adapted also to act as a part of the means for securing the wing sections together, clinch bands such as shown in Figs. 16, 17 and 18 are applied. Each band includes a band proper 91, a hinge 92 desirably located adjacent the trailing edge, and on the opposite face of the wing adjustable means for securing the ends of the band together. This adjustable means is designed to give minimum parasite resistance, like other parts of the clinch band. To that end, the adjustable means shown includes left and right threaded screws 93 and 94 at the ends of the band and a connected turnbuckle 95.

In order to provide a main means for securing the wing sections together, and one wholly contained within the envelope to be finally established for the entire wing, a plurality of strong yet light-weight securing and locally-strengthening devices for the matching ends of spar-beam lengths on contiguous wing sections are provided. One of such devices is shown in Figs. 21, 22 and 23. According to this construction, the end of a chord member length of one wing section to be connected to the matching end of a chord member length of an adjoining section, and the last-mentioned chord member length, are respectively provided with auxiliary sheet metal parts of somewhat dissimilar character. One of such chord member lengths, as that one partially shown in Figs. 21 and 23, at its end to be connected to another chord member length, has inserted within it, and snugly held between its U-member 77 and its channel 78, a sleeve or hollow plug 84 of sheet metal. The matching chord member length, as that one partially shown in Fig. 22, is provided with a yoke or stirruped gusset-plate 85 externally secured thereto, desirably by being riveted, not only to the U-member 77 but also to certain of the upright and inclined braces, as shown also in Fig. 22. The gusset-plate 85 of one chord member length overlaps the sleeve or plug 84 of a matched spar-beam length, when the wing-sections are in properly assembled condition. All the various sheet metal elements which overlap when the matching chord member lengths are thus brought together for mutual securement, are provided with registering apertures, marked 86 in Fig. 23, through which a suitable locking pin is extended. For added strength, each one of a pair of spar-structure sections assembled by thus joining their chord member lengths, may have an extra vertical strut at or near its end as indicated at 79 in Fig. 21; so that each completed spar-structure is provided with a double complement of upright struts close to and on opposite sides of the planes of juncture (Fig. 19; 79') of contiguous wing-sections.

In a wing structure such as just described, it has been found possible to support the fuel tanks entirely within the surfaces of the thick hollow wing, and thereby attain several important advantages. More room is gained in the fuselage; and a better weight distribution throughout. Further it has been found that the tanks may be conveniently mounted in the wing, and directly on the contained frame-work, or rather directly suspended from certain of the spar-elements, by simple attachments. Such an arrangement permits easy mounting of the tanks during the building up of a wing or wing section, and without in any way tending to decrease the inherent stiffness and strength of such wing or section, during building, while at rest, or in flight. Moreover, the tanks may be removed from the wing without disturbing the wing structure even when the ship is completely assembled. The tanks may be detached from their mountings and moved out of the wing without removing any portion of the cover material or surfacing. An egress way for the tanks is afforded through the hollow wing, spanwise thereof, and thence through the ceiling of the fuselage at the central frame-work of the wing section 60 overlying the fuselage. Thus the tanks may be placed in a closed compartment remote from pilot and engine.

In this connection, see particularly Figs. 51 and 52. Here one or more supporting bands 225 pass beneath the tank 226 and over the upper plate members of two of the main spars, to where they are secured. Other bands pass over the tank and around the lower plate members of the main spars, to which they are secured. Strips of felt may be placed between the supporting bands and the tank, to insure a rigid and noiseless mounting. One set of the bands may be provided with tightening devices 228. The intake opening 229 of the tank is placed adjacent to the wing covering, to permit of filling through a suitable opening therein.

The engine support and the fuselage frame, as well as the ailerons and the tail appendages may, like the wing frame, be constructed of shaped bars or sections of a rolled light rust-proof metal such as duralumin, and covered with the same material, corrugated fore and aft, the covering being so secured to the frame as to add strength thereto.

The engine supporting frame with the engine housing, is preferably adapted for removal from the fuselage proper as a unit, thereby facilitating changing of engines. Such a detachable engine housing and frame is illustrated in Figs. 11, 12 and 28. Ears 96, comprising openings 100, extend forward from the fuselage frame and are received in suitable recesses 97 in the unitary engine frame, which is further guided and held by the lateral plates 98 and 99 (Fig. 28). When the engine frame is in place, openings 101 are aligned with openings 100 in the engine frame. By inserting a bolt or pin through each pair of aligned bolt holes 100 and 101 the engine is secured in place, and it is released for removal by withdrawing such bolts or pins. The back of the engine compartment is closed by a rear wall or cover plate 103, carrying an engine control instrument panel 104 adapted to be received in an opening 105 in the front closing or partition wall 106 of the pilot compartment.

The configuration of the engine housing may be such that the air stream is directed upwardly, as diagrammatically indicated in Fig. 12, so that there is little or no wind pressure on the wind-shield 115 hereinafter referred to more in detail.

The engine supporting frame may comprise a pair of horizontally extending engine carrier beams 107 of channel or other suitable shape. Each beam is connected near its forward end with a downwardly, rearwardly and outwardly extending compression strut 108, and either directly or through the compression strut with an upwardly, rearwardly and outwardly extending tie bar 109. The strut and tie bar on each side of the frame are secured together by an intermediate brace 110.

The rear end of each engine carrier is supported by a pair of forwardly extending diagonal braces 111 and 112, connecting with the compression strut 108 and the tie bar 109 at the ends of the brace 110; and a pair of rearwardly extending diagonal braces 113 and 114, connecting respectively with the ends of the bar 109 and strut 108, adjacent to the points at which these members are secured to the fuselage, as hereinbefore described. The radiator, 1070, may be supported by a frame 1071, suitably attached to the engine frame. The engine or power plant used is thus complete in itself, and on the connection of the fuel line to the fuel tanks is ready for operation. The various features mentioned by this present paragraph, however, form the subject-matter of, and are also claimed in, my copending application Serial No. 122,758 filed July 16, 1926.

The pilot may be conveniently located in the front end of the fuselage, under the forward edge of the wing, as seen in Fig. 13, the front end above the partition 106 being closed by the paneled wind shield 115 which extends upwardly and rearwardly to the leading edge of the wing. The relation of these parts is such, it will be noted, that a wind-shield is provided comprising an extension of the leading edge of the wing so shaped and disposed that the wind is deflected over the upper surface of the wing to assist in lift, and thus avoid providing even here a parasite surface.

From what has been explained, it will be seen that there is provided an airplane including a wing equipment carrying or sustaining a fuselage or equivalent housing for an engine, a pilot's station, and a compartment for the accommodation of the majority if not all of the useful load; the engine and said station being substantially in front of the leading edge of the wing, and such compartment being substantially between the front and rear limits of the wing; the rear portion of the entire ship, as the tail of the fuselage, being of course suitably proportioned as to length, shape and weight to avoid any possible tendency for the ship to bear down at the head. Some of these details, however, while hereinafter described somewhat more at length, form the subject-matter of my copending application Serial No. 122,758 filed July 16, 1926; except that the pilot's station and its relation to the general structure herein shown and claimed, form, in one aspect at least, a feature of the present application. In the first place it will be noted that the pilot is at a fairly elevated position, thus incidentally shortening up the part of the ship ahead of the wing, but also giving the driver that unobstructed vision which is ideal. In this respect, the arrangement shown constitutes a modification within the disclosure of my said previous application Serial No. 285,981. This general subject matter was originally disclosed in application, Serial No. 233,089, and in this regard the present application is in lieu of those applications.

The airplane performance indicating instruments may be conveniently located on the partition wall 106, adjacent to the engine instruments on the panel 104, which, as already pointed out, extends into an aperture in the partition wall 106. Windows 116 afford the pilot a view to the sides of the plane.

The fuselage frame may be constructed of channels, angles, and other suitable shapes of rolled metal. One very desirable shape consists of a U channel shape having laterally extending flanges adapted to receive the rivets or other devices with which the covering is rigidly secured to the frame. In Fig. 28 the lower longéron 117 is shown as an angle, while the upper longéron 118 and many of the diagonal and vertical braces have the flanged channel shape above described.

The sides and bottom of the fuselage may be transversely substantially flat. The forward part of the top is also substantially flat transversely, and longitudinally it conforms to the lower side of the wing frame. To the rear of the wing the top of the fuselage is quite deeply arched. The trailing edge of the wing joins the fuselage substantially at the top of the straight sides thereof, and the main wing spars 70 and 71 rest on the longérons 117, as shown in Fig. 28. Forward from the central main spar 70 the longéons 118 are divided, one branch 1180 extending upwardly to furnish a support for the forward main spar 69, and the lower branch 1181 connecting through the heavy channel 1182 with the engine support attachment piece 99.

The wing attachment plates 83 are secured to the fuselage frame adjacent to substantially vertical braces 119, joining the upper and lower longérons. A very sturdy and secure attachment of both the engine carrier and the wing to the fuselage is thus secured, and the parts of the fuselage frame to which the engine and the wing are attached are so joined to other frame members that ample strength and rigidity is assured.

The forward part of the fuselage is designed to carry the load of freight or passengers, as well as supporting the engine and the wing, hence the frame comprises a sufficient number of heavy members to form a structure of ample strength, independent of the metal covering, while toward the tail the frame is lighter, as shown in Fig. 29, and the skin or covering forms a stress carrying member. The upper longérons 118 may terminate at appropriate distance back of the wing spars, the members 120, to which their ends are secured, being tied to the lower longérons by diagonal tension members 121. A single longitudinal rib 122 may be used for a stiffener at the top of the transverse frame arches. The rib as well as the curved arch members 123 have been shown as of flanged U shape, while the vertical braces to which arch forming member is secured have been shown as angles 124 (Figs. 31-33). Each of the transverse frames may comprise horizontally extending members 1241 and diagonal braces 1242 extending from the center of each member 1241 to the opposite corners of the frame. It should be noted that the top or back of the fuselage is substantially parallel to the engine shaft, while the bottom, to the rear of the load carrying compartment, slants upward. The tail plane and elevator are thus brought substantially above the stream of air disturbed by the propeller and the wing. This construction also permits the use of a lower landing gear.

The fuselage decreases in width as well as depth toward the tail, and terminates in a rudder 125, a rudder deflector 126, and an elevator 67. The usual stabilizing tail plane is made into an adjustable member called a "horizontal stabilizer", 68, which functions as follows: A suitably curved and relatively fixed surface in front of the elevator is necessary to the proper functioning of the elevator. The angle of incidence of such a surface is an important factor in determining its effectiveness, its efficiency being greatly impaired by relatively small changes in the angle of incidence. Obviously when the angle of flight is changed the angle of incidence of the elevator deflector is also changed. Moreover, when the load is shifted, as by passengers moving about, the relation of center of gravity to the center of pressure is altered, and such a change can be best compensated by changing the angle of incidence of the tail-plane. In the airplane of the present invention there is contemplated the provision of an adjustable horizontal stabilizer, with means controlled by the pilot for adjusting the same when the need for such adjustment arises. To this end the horizontal stabilizer 128 is provided near its center with a pivot 129, by which it is pivotally supported on a frame 130 in the rear end of the fuselage. The forward edge of the elevator 127 may comprise a U bar 131 encircling a channel 132, thereby providing a rigid support for one or more angles 133. The trailing edge of the elevator stabilizer may be suitably strengthened, the construction illustrated comprising a wide, vertically disposed channel 134, to which are secured smaller horizontally disposed upper and lower channels 135 and 136. To the channels 135 and 136 is secured a second wide channel 137, which supports angles 138, each comprising an eye 139 adapted to receive a hinge pin passing through corresponding eyes in the angles 133 on the elevator. The elevator may comprise the usual king post 140 for the attachment of the control cable. As a satisfactory means for varying the angle of incidence of the horizontal stabilizer, a construction has been illustrated as follows (Figure 36): A slide which may comprise vertical bars 141 guided in channels 142 and connected by transverse and diagonal bars 143 and 144 is pivotally connected to the elevator stabilizer. The connection may comprise ears 144 depending from the elevator stabilizer, and a king pin 145 passing through perforations in the ears 145 and the bars 142. A screw 146 is secured at the bottom of the slide by any suitable means, such as rivets 147 passing through the screw and through plates 148 secured to the slide. The screw 146 passes through a threaded sleeve or nut 149 held against translational movement by jaws 150 extending from a bracket 151 secured to the fuselage frame, and engaging upper and lower flanges 152 and 153 on the sleeve. The flanges 152 and 153 also serve as guides for a cable which encircles the sleeve between the flanges and extends forward to a suitable control device in the pilot's compartment. By manipulation of this control device the part of the horizontal stabilizer to which the slide is attached may be raised or lowered as desired, and the horizontal stabilizer maintained at all times at the correct angle of incidence.

Improved means for attaching the tail skid are provided which may be constructed as follows: The skid 155, which is rigid with an upwardly extending lever 156 having an elastic connection 157 with the frame 130, is pivoted between ears 158 on a swivelled member which extends below the fuselage, and is pivotally joined to a vertical frame within the fuselage. Said frame may comprise diagonal braces 160—161, and a central strut 162 suitably connected to each other and to the fuselage frame. A stop 163 may be provided for limiting the movement of the tail skid by the elastic 157.

The load carrying section of the fuselage lies generally beneath the wing, and may be divided into suitable compartments, each provided with furnishings adapting it to a particular purpose; for example, a plane furnished as a pullman passenger transport has been illustrated. The main passenger section 164 (Figure 26) contains two rows of upholstered seats, and a toilet and wash room 166 with the usual furnishings separating the passenger compartment from the pilot house. The seats like all other parts of the airplane, are constructed chiefly of duralumin, and may be arranged for quick and easy conversion into pullman berths. One type of pullman chair or seat has been illustrated in Figs. 53 to 55. This chair comprises a back 167, a seat 168, and a foot board 169. Frame plates 170 provide a support for the entire structure. The foot board 169 and seat 168 are both pivoted by a bolt 172 to brackets 171 extending upwardly and forwardly from the frame plates. The back 170 comprises a pivot 173 which is received in a slot 174 in the side frame member of the seat 168. Rigidly secured to the back is an arm 175 which comprises a laterally extending foot 176 received in a guide slot 177 in the frame plate 171. Suitable means are provided for holding the foot 176 in the guide slot, and the slot may be covered by a suitable cover plate 178. Pivoted to the foot 176, adjacent the inside of the frame plate 171, and to a bracket 179 extending from the foot board 169 is a connecting link 180. A slot 181 may be provided in the frame plate 171 for the accommodation of the joint between bracket 179 and link 180. It will be seen that if the top of the chair back is pressed backwardly and downwardly the foot board seat and back will be moved into alignment with each other, as shown in Fig. 55, the foot 176 traversing the length of the slot 177, while the pivot 173 traverses the slot 174 and returns to its initial position therein.

The passenger compartment is lighted and ventilated through windows 182, which may be placed adjacent to each of the seats, or in any other suitable location. The windows may be semicircular in shape, and comprise two quadrantal panes 182 and 183 of transparent material, one of which may be pivoted at 184 to permit of opening by rotation about a pivot perpendicular to the plane of the window. A finger piece 185 may be provided for facilitating manipulation of the window.

Access to the fuselage is had through a door leading into the passenger compartment which may be constructed as shown in Figs. 48 and 49. A frame of a suitably shaped metal bar 186 is provided with a cross bar 187. Below the cross bar the frame is covered inside and out with corrugated sheet metal, while the space above the cross bar is closed by a sheet of transparent material 188.

The pilot compartment and the passenger compartment may be closed off from other parts of the fuselage by such doors, 189, 190 and 191 (Fig. 26). Figs. 44 and 45 illustrate one form of the door 190, comprising a frame of metal channels 192 covered on both sides with corrugated sheet metal 193. The lower part of the door tapers very nearly to a point, in order to clear the diagonally extending fuselage braces. The frame for the door 189, shown in Figs. 46 and 47, consists of a rolled metal shape comprising a web 194 having flanges 195 and 196 extending in opposite directions therefrom. This frame is also covered with corrugated sheet metal 197.

It is desirable to provide means for shutting off the noise of the engine, as well as engine gases, from the passenger compartment, and, to this end, hollow double walled doors have been provided.

The flight control mechanism in the pilot compartment, illustrated in Figs. 41-43, is arranged for dual control, two pilot seats 198 and 199 (Fig. 26) being provided. Each set of control devices comprises a control column 200, rigid with the transverse shaft 201 (Figure 41) supported on bearings 202 from the frame. Shaft 201 carries the arm 203 for connection with a cable from the lower end of the king post 140 on the elevator. A cable from the upper end of said king post connects with a collar 204 on the control column.

Each steering wheel 205 is secured to a spindle 206 supported in bearings in a yoke 207 secured to the top of the control column. Said spindle 206 carries a sprocket wheel 208 adapted to receive a chain 209, to which the aileron control cables 210 are attached. The rudder control cables 211 pass over a grooved wheel 212 fixed to a transverse shaft 213 carrying oppositely extending pairs of arms 214 and 215 for the attachment of links 216 and 217 connected respectively with the right and left pedals 218 and 219. Shaft 213 is supported in arms 220 depending from a frame member 221. The pedals 218 and 219 are pivoted to the frame at 1220, and are pivotally connected to the links 216 and 217 by frames of V-shaped sheet metal 1221 (Fig. 43), the ends of the links being bifurcated to receive the juxtaposed parts at the lower end of the vertex of the V frame.

A flexible shock absorbing under-carriage or landing gear is provided, one form of which is illustrated in Figs. 38-40. Each wheel 230 is rotatably mounted on a spindle 241. To the inner end of the spindle 241 is attached a collar 242 to which an upwardly extending rod 243 is connected by means of a swivel-joint 244. The upper end of rod 243 is pivotally connected to a guide block 245 adapted to slide vertically in a guide channel 246 on the side of the fuselage. Near the upper end of rod 243 is likewise secured a transverse pivot bar 247 which terminates in broad flat heads 248. A similar bar 249 is secured in supporting plates 250 projecting from the fuselage a short distance below the lower end of the guide channel 246. A cord 251 of an extensible elastic material is passed around the parallel rods 247 and 249, thus forming resilient shock absorbing connection between the undercarriage and the fuselage.

A thrust member 252 extends diagonally upward from the wheel and has a swivel connection 253 with a block 254 supported between springs 255 on a rod 256 mounted on a frame 257 secured to the transverse fuselage frame member 258. Block 254 receives a thrust member 252 from each of the two wheels, located at opposite sides of the fuselage. A second thrust member 259 extends upwardly, rearwardly and inwardly from the wheel spindle, and is attached through a swivel joint 260 to a point near the center of the fuselage. The lower ends of thrust members 252 and 259 are received in clamping devices 261 associated with the wheel supporting spindle 241, as shown in Fig. 40. Members 243, 252 and 259 may be conveniently made of circular tubing.

A wing of the character described has its center of pressure moved forward as the wing is tilted upwardly and rearwardly as the wing tilts down. This may be expressed by stating that the wing has a series of center of pressure vectors which intersect each other below the wing, these vectors being, in fact, the vertical lines drawn through the centers of pressure of the wing when the wing is tilted, all of the said vectors being then correlated to each other as the wing is restored to normal position by being revolved with the wing, maintaining their position relative to it. The intersections of these vectors, however, with the wing described, is below the lower edge of the wing itself. The center of gravity of the entire plane is close to this intersection, so that the plane is substantially supported at its center of gravity at all times. In the plane illustrated, the center of gravity is slightly above the intersection. This condition makes for maneuverability without undue instability. The advantages of the sub-assembly system of construction will be obvious. It not only enables the component parts to be constructed and tested as interchangeable units, but, in the event of damage or need for repairs, the defective part may be removed and a new part substituted without the necessity of rebuilding the defective part upon the machine itself. Certain or all of the features described in this present paragraph are fully described and claimed in my copending application Serial No. 233,089 filed May 7, 1918.

While one form of the invention has been shown and described in detail, it should again be emphasized that the drawings and the foregoing description merely indicate a typical embodiment of invention which may take many different forms.

In this specification I have referred to a "fat" wing and this type of wing should not be confused with the so-called "thick" wings in use prior to my invention. In wings in use prior to my invention, it was customary to provide a depth at the root of the wing approximately one-twelfth the chord of the wing; and in no case was the depth of the wing section sufficient to contain structure strong enough to support the load without outside bracing. My wing is thus also to be distinguished from previous forms in that throughout its length it is of sufficient depth to house between its upper and lower surfaces the necessary structural parts to give complete self-sustaining rigidity to the wing to enable it to withstand all shocks, stresses or strains to which it may be subjected in flight; and as an example I may say that it is desirable, with present day material, that such a wing should have a thickness at the root thereof at least one-fourth the chord of the wing at this point.

It will, of course, be understood that in a wing construction such as I herein disclose, wherein the cover consists of a sheet of stiff material having substantially the same coefficient of expansion as the material of the internal structure, and wherein said cover is applied to the internal structure in substantially rigid relation thereto, said cover imposes no parasite and indeterminate stresses or deforming loads upon such structure, such as are produced by the usual stretched fabric and "doped" wing cover. In this connection, speaking of the elimination of all possible invisible or latent as well as visible deformations, or sources of unexpected future weaknesses or breaks, particularly from the unfavorable reactions of one structural element relative to another,—several points should be emphasized. In the first place, the elongate elements or bar-like members making up the internal frame-work, are products obtained from laterally deforming flat strips of suitable material by subjecting such strips to pressure across their flats. As already explained, this method is preferably carried out by longitudinally feeding these flat strips through pressure rolls. Thus the normal lie of the grain of the material of the strips, which lie is longitudinal of the strips, is maintained if not intensified in that lie, as the result of the operation of forming such elements or members of angle, V, U or other channel-cross-section or the like; as sharply to be distinguished from the grain arrangement of the tie, strut and brace elements of metal and other truss-constructions wherein tubular elongate elements may be employed, particularly when such tubular elements are formed by the extrusion process. In other words, these last-mentioned elongate elements have the grain of their material displaced transversely during the process of fabrication. A tube or a channel part made by cutting away a part of a tube will snap crossways, because the grain runs crossways, to a certain extent certainly. Such a defect is one of the most serious latent defects. The condition is invisible, often even under the miscroscope; no warning is given of the imminence of a break. Further, in the present truss-construction for the internal bracing of an air-attacking body, the elongate elements or bar-like members are so arranged, in addition to being rigidly connected at certain points, as to provide at the required points double insurance against even the remotest possible failure of such elements. For instance, here the chord member 1700, as features of the illustrative structure of the drawings, are each constructed so as to comprise a plurality of elongate members having longitudinal channels, such members intimately connected along their inter-nested lengths. It is inconceivable that the two or more of such connected members, making up any one of such chord member, will ever suddenly fracture at precisely a point in each member representing a single beam-disruptive plane of fracture. In this connection, note again the composite chord member, here of D-section, shown in Figs. 20 to 24, comprising two elongate members 77 and 78. Again, as already pointed out fully, all structural elements, within which term are also included all connective elements as well as all air-reactant or exposed surfacings, are made of a material or materials, preferably suitably light yet strong and rust-proof materials, having the same coefficient of expansion; consistent with which feature of the invention, the composite chord member just-described has, for instance, the channel components 77 and 78, and also the rivets binding the two, made of the same metallic material, which material may well be duralumin, although not of course necessarily to be limited to that. In this connection, it is not thought to be generally known (being a fact I have learned from actual experience in building and flying fat-wing planes) that unequal strains on different rivets is inevitable where rivets or fitments are made of a material of one coefficient of expansion and the connected stays, struts, braces, beams and the like are made of a material of a different coefficient of expansion. For instance, I have found that when say a steel fitting is riveted to a duralumin part, the latter is likely to stretch relative to the former, thus throwing more strain on one rivet than on another. Thus the invention in one fundamental aspect consists in structural bracing, preferably trussing, contained within the limits proper of a thick wing, such bracing consisting of spar elements, strut elements, &c., as a cover or air-engaging surfacing, and pinning, riveting or similar elements, all made of the same material, or the majority of them made from laterally deforming strip elements without displacing the grain as hereinabove explained. In another but related aspect, the invention consists in such structural bracing contained within the limits proper of any air-engaging body or subdivision of an airplane. Consequently certain of the appended claims call for a structure rather than a wing-structure; although, as already pointed out, the present application is primarily devoted to wing structure. Similarly, certain of the appended claims call for relations and features having to do with air ship combinations including more than wing structure per se; such for instance, as important co-actions of the wing propeller and empennage-elements, or special configurational and spatial relations between wing and fuselage permitting marked improvements in the L/D ratio and in other operative characteristics of the ship, &c. In this connection, for example, it is clear that while a certain wing shape and structure may be primarily involved, yet such wing shape and structure, if pursuant to the present invention, is but one part of such a combination as, for example, that one herein disclosed and comprising a supporting wing and a fuselage so intimately associated with the wing as to eliminate the necessity of exposed mutually bracing elements, and/or so associated as to avoid protusion of a part of the fuselage above the top of the wing to obtain adequate head-room, and so on. But, nevertheless, as already pointed out, my said copending applications Serial Nos. 122,758 and 139,591, 139,592 and 139,593 claim also various fuselage and other features of the present airplane as illustrated and described herein.

As to the claims hereinbelow, it is to be again emphasized that in view of the fact that many changes could be made in the construction shown in the drawings, and many apparently widely different embodiments of the invention could be made without departing from the scope thereof, I intend that all matter contained in the above description or shown in said drawings shall be interpreted as illustrative and not in a limiting sense.

Accordingly, the following definitions of certain terms and expressions as used herein, may be now given, but solely for maximum clearness of exposition or to indicate present preferences in carrying out the invention, and so not to be taken, directly or indirectly, as limiting anything else said herein:

By the expression "inherently stiff and rigid" as used in regard to the nature of material employed, is meant a stiffness or rigidity existing as a characteristic attribute of the material of which a plate or sheet element is made, when such sheet or plate is of a thickness appropriate to the tensile strength yet lightness of weight required, whether such sheet be unitary or laminated or otherwise built up through its thickness. By the words "stiff" and "rigid", is meant a quality betraying itself not only as a resistance to tension, but also a resistance to "easy" compression and flexure. By the expression last-given, is meant a resistance to compression and flexure sensibly greater than that exhibited by say a sheet of textile material interwoven of cotton, silk or similarly limp strands, even after such textile sheets have been varnished, shellacked, or otherwise "doped" as the word is used in the art.

By the expression "wing-cantilever" is meant an internally braced thick wing so constructed that once assembled, it exists as a truly stiff and rigid assembly. By "truly stiff and rigid", obviously, is meant something to be sharply distinguished from that merely comparative degree of stiffness and rigidity meant in referring to any of the sheet or plate elements of the wing as stiff and rigid.

The terms "wing-cantilever" and "wing-cantilever section" have been used in such manner, that, it is thought, the different intended meanings will be clear; where the term "wing-cantilever structure" is used, the intention is to make reference to either a wing-cantilever or a wing-cantilever section.

The expression "spar-element" has been used in an inclusive sense, as referring to a spar-structure, or to a chord member, or to a spar-strut; that is, as referring to any element of the internal frame-work, whether such element be a single elongate member or a combination of such members, which extends more in a spanwise direction than in a fore and aft direction relative to the wing. Such single elongate member may constitute what I have termed herein a chord member, that is, an elongate member disposed against or substantially parallel to an inside surface of the top or bottom wing cover; or what I may describe as a "spar-strut", that is, an elongate member disposed upright or arranged as a diagonal within the wing cover but extending generally spanwise of the wing. And a combination of such chord members, or of such chord members, or of such spar-struts, or both, when relatively arranged and connected to mutually react either directly or by way of the wing cover to strengthen the wing, constitutes what I have termed herein a "spar-structure". Such a spar-structure which includes a plurality of chord members, as upper and lower spar-beams in substantially the same vertical plane, in combination with a plurality of spar-struts, provided the parts are so secured together independently of their securement to the wing cover as to constitute a self-complete and self-rigidifying frame-work subdivision, I may describe as a "trussed-spar".

The expression "rib-element" has also been used in an inclusive sense, as referring to a rib-structure, or to a rib-beam, or to a rib-strut; that is, as referring to any element of the internal frame-work, whether such element be a single elongate member or a combination of such members, which extends more in a fore and aft direction than in a spanwise direction relative to the wing. Such elongate member may constitute what I may describe as a "rib-beam" (although I prefer not to make use of such a rib-beam); or what I may describe as a "rib-strut", that is, a member disposed upright or arranged as a diagonal within the wing cover, but extending generally chordwise of the wing. And a combination of such spar-beams, or of such spar-struts (which I prefer to use), or of both, constitutes what I have termed herein a "rib-structure."

Nevertheless, it is to be understood that the language used in the following claims is intended to cover all the generic and specific features of the invention hereindescribed, so far as any such features are not allocated, as hereinabove pointed out, to copending applications constituting divisions hereof. The following claims are also intended to represent statements of the scope of the invention subject to full allowance of the due and proper range of equivalents. These claims are thus to be construed as extending to all such forms or modifications of the invention as fall within a broad interpretation of the terms used in the claims.

Having thus fully described my invention, what is claimed is:

1. A fat wing-structure including a plurality of main spars interconnected with a plurality of secondary spars, each of said main spars comprising spar-beams of D cross sections, and each of said secondary spars comprising laterally bent spar-beams having marginally offset flanges adapted for attachment to the wing covering.

2. A unit fabricated fat wing section inherently rigid in flexure and torsion which includes an internal frame-work and internal and external means for securing said section to another section, the external means being non-parasitic.

3. In an airplane, a spar-structure comprising longitudinal sections including spar-beams and vertically and diagonally extending struts, and means for securing adjacent sections together including a gusset plate partially encircling the abutting ends of matching spar-beams of adjoining sections, said plate secured to said spar-beams and to certain of the struts.

4. In an airplane, a fabricated sectional spar-structure the sections whereof have spar-beams formed of shaped strips of rolled metal, and means for securing adjacent sections together, said means including a sleeve conforming to the interior configuration and adapted to enter the abutting ends of one of matching spar-beams of adjoining sections and a gusset plate partially encircling said ends of said spar-beams.

5. In an airplane, a spar-structure fabricated as a plurality of separate sections having spar-beams, aligned when assembled, and means for securing said sections together, said means including a sleeve for snugly fitting within the abutting ends of one of aligned spar-beams and a gusset plate snugly fitting around said abutting ends and secured to one spar-beam by rivets and to the other spar-beam by a pin entering through opposite sides of said gusset plate, of the spar-beam last-mentioned, and of said sleeve.

6. In an airplane, a sectional hollow spar-structure the sections whereof incorporate spar-beams and oblique struts, and means for securing a joint of requisite strength between contiguous sections, said means including a vertical strut near the joint end of each section and internal and external joint reinforcing elements for said spar-beams.

7. In an airplane, in combination, a wing inherently rigid in flexure and torsion comprising spars and a spar covering adapted to be fabricated in separate unitary sections to be assembled in end to end relation, means for securing spar-elements of adjacent sections together to form a substantially continuous spar-structure, and means for covering and reenforcing the joint in the wing covering at the junction of adjacent wing sections.

8. In an airplane, an all metal wing inherently rigid in flexure and torsion comprising a plurality of units adapted to be separately fabricated and covered, and subsequently secured together, and covering bands secured over the wing to cover joints between the wing units.

9. An airplane-wing joint-covering band having a hinge located on the upper side of the wing adjacent to the trailing edge and a turn-buckle located on the under side of the wing adjacent to the trailing edge.

10. In an airplane comprising a plurality of separately fabricated and covered wing sections, means for closing the joint between the coverings of adjacent sections comprising a band encircling the joint and having a hinge in the upper surface, near the trailing edge, and tightening means in the lower surface near the trailing edge, the band being otherwise continuous.

11. A wing structure comprising a rigid skin having a body portion of corrugated metal and a leading edge portion of uncorrugated metal, a wing rib section comprising spacing uprights, corrugated metal conforming to the wing contour forming the connecting member between said uprights, and diverging rigid braces connecting the top of the one upright with the bottoms of the adjacent uprights.

12. An airplane wing comprising a plurality of spaced main spar structures, each including rigid compression and tension members, secondary spar elements disposed between said main spars, struts inclined between said main and secondary spars and all of said elements providing a frame resisting flexion stresses from one tip of the wing to the other of the same and a skin of rigid material encircling said frame and fixedly attached thereto at a number of points, said skin in conjunction with said frame forming a truss resisting torsional stresses.

13. An airplane wing comprising a plurality of spaced main spar structures, each including rigid compression and tension members, secondary spar elements disposed between said main spars, struts inclined between said main and secondary spars and all of said elements providing a frame resisting flexion stresses from one tip of the wing to the other of the same and a skin of rigid corrugated material enveloping said frame and attached thereto at a number of points to form a truss therewith, the corrugations extending transversely of the wing and said skin, in cooperation with said frame, preventing transverse distortion of the wing.

WILLIAM B. STOUT.